US012807259B2

(12) United States Patent
Tachibana et al.

(10) Patent No.: US 12,807,259 B2
(45) Date of Patent: Nov. 24, 2026

(54) ELECTRIC DEVICE AND DERAILLEUR OF HUMAN-POWERED VEHICLE

(71) Applicant: SHIMANO INC., Sakai City (JP)

(72) Inventors: Katsuhiro Tachibana, Sakai City (JP); Akihiro Nozaki, Sakai City (JP); Tomoki Koide, Sakai City (JP)

(73) Assignee: SHIMANO INC., Sakai (JP)

( * ) Notice: Subject to any disclaimer, the term of this patent is extended or adjusted under 35 U.S.C. 154(b) by 533 days.

(21) Appl. No.: 18/324,101

(22) Filed: May 25, 2023

(65) Prior Publication Data

US 2024/0391550 A1 Nov. 28, 2024

(51) Int. Cl.

| | |
|---|---|
| ***B62J 45/00*** | (2020.01) |
| ***B62J 45/413*** | (2020.01) |
| ***B62J 45/414*** | (2020.01) |
| ***B62M 9/122*** | (2010.01) |
| ***B62M 25/08*** | (2006.01) |
| ***G08C 17/02*** | (2006.01) |
| *B62M 6/50* | (2010.01) |
| *B62M 25/00* | (2006.01) |

(52) U.S. Cl.

CPC ............. *B62J 45/00* (2020.02); *B62J 45/413* (2020.02); *B62J 45/414* (2020.02); *B62M 9/122* (2013.01); *B62M 25/08* (2013.01); *G08C 17/02* (2013.01); *B62M 6/50* (2013.01); *B62M 2025/006* (2013.01)

(58) Field of Classification Search

CPC ........ B62J 45/00; B62J 45/413; B62J 45/414; B62M 9/122; B62M 25/08; B62M 6/50; B62M 2025/006

See application file for complete search history.

(56) References Cited

U.S. PATENT DOCUMENTS

| | | | | |
|---|---|---|---|---|
| 8,655,561 | B2 * | 2/2014 | Kitamura | B62K 23/06 701/51 |
| 10,308,319 | B1 | 6/2019 | Chuang et al. | |
| 10,377,444 | B2 * | 8/2019 | Suzuki | B62M 6/90 |
| 10,392,078 | B2 | 8/2019 | Jordan et al. | |
| 11,970,242 | B2 * | 4/2024 | Nekozuka | B62M 9/122 |
| 2011/0320093 | A1 * | 12/2011 | Kitamura | B62M 25/08 701/1 |

(Continued)

FOREIGN PATENT DOCUMENTS

| | | |
|---|---|---|
| CN | 108313192 | 7/2016 |
| CN | 109808825 | 5/2019 |
| DE | 102018207493 | 11/2019 |

*Primary Examiner* — Kevin Hurley
*Assistant Examiner* — Michael R Stabley
(74) *Attorney, Agent, or Firm* — MORI & WARD, LLP

(57) ABSTRACT

An electric device of a human-powered vehicle comprises a communicator and an electronic controller. The communicator is configured to communicate with an additional communicator in accordance with a communication mode. The electronic controller is configured to execute a first control to change the communication mode in a case where a first condition that an output of an output unit is greater than or equal to a first threshold is met. The electronic controller is configured to execute a second control different from the first control in a case where a second condition that the output of the output unit is greater than or equal to a second threshold is met, the second threshold being different from the first threshold.

27 Claims, 19 Drawing Sheets

(56) References Cited

U.S. PATENT DOCUMENTS

| | | | |
|---|---|---|---|
| 2016/0311491 | A1 | 10/2016 | Watarai |
| 2018/0178881 | A1 | 6/2018 | Miglioranza |
| 2019/0031283 | A1 | 1/2019 | Suzuki et al. |
| 2020/0346714 | A1 | 11/2020 | Hahn |
| 2021/0331550 | A1 | 10/2021 | Schoolcraft, Jr. et al. |
| 2022/0212753 | A1 | 7/2022 | Dueweling et al. |

* cited by examiner

ELECTRIC DEVICE AND DERAILLEUR OF HUMAN-POWERED VEHICLE

BACKGROUND

Technical Field

The present invention relates to a, electric device and a derailleur of a human-powered vehicle.

BACKGROUND INFORMATION

A human-powered vehicle includes an electric unit. The electric unit is configured to control an additional electric unit and configured to communicate with the additional electric unit.

SUMMARY

In accordance with a first aspect of the present invention, an electric device of a human-powered vehicle comprises a communicator and an electronic controller. The communicator is configured to communicate with an additional communicator in accordance with a communication mode. The electronic controller is configured to execute a first control to change the communication mode in a case where a first condition that an output of an output unit is greater than or equal to a first threshold is met. The electronic controller is configured to execute a second control different from the first control in a case where a second condition that the output of the output unit is greater than or equal to a second threshold is met, the second threshold being different from the first threshold.

With the electric device according to the first aspect, the first control and the second control enable the electronic controller to change the communication mode and to perform another action based on the output of the output unit.

In accordance with a second aspect of the present invention, the electric device according to the first aspect is configured so that the communicator is configured to receive a signal from the additional communicator.

With the electric device according to the first aspect, it is possible to utilize the signal transmitted from the additional communicator.

In accordance with a third aspect of the present invention, the electric device according to the first or second aspect is configured so that the second threshold is greater than the first threshold.

With the electric device according to the third aspect, it is possible to execute the first control and the second control based on different thresholds.

In accordance with a fourth aspect of the present invention, the electric device according to any one of the first to third aspects is configured so that the second control includes an actuating control in which the electronic controller controls an actuator to move a movable member.

With the electric device according to the fourth aspect, it is possible to move the movable member based on the output of the output unit.

In accordance with a fifth aspect of the present invention, the electric device according to the fourth aspect is configured so that the actuating control includes a returning control in which the electronic controller controls the actuator to move the movable member to a target stop position in a case where a position of the movable member is offset from the target stop position.

With the electric device according to the fifth aspect, it is possible to return the movable member to the target position in the state where the position of the movable member is offset from the target position.

In accordance with a sixth aspect of the present invention, the electric device according to any one of the first to third aspects is configured so that the second control includes an obtaining control in which the electronic controller obtains information for adjusting a target stop position of the movable member based on the output of the output unit.

With the electric device according to the sixth aspect, it is possible to utilize the information for adjusting the target stop position.

In accordance with a seventh aspect of the present invention, the electric device according to the sixth aspect is configured so that the electronic controller is configured to identify a chain vibrating position of a chain mounted on the human-powered vehicle based on the output of the output unit in the obtaining control.

With the electric device according to the seventh aspect, it is possible to utilize the chain vibrating position for adjusting the target stop position.

In accordance with an eighth aspect of the present invention, the electric device according to the sixth or seventh aspect is configured so that the electronic controller is configured to adjust a target stop position of the movable member based on the output of the output unit in the obtaining control.

With the electric device according to the eighth aspect, it is possible to adjust the target stop position depending on the output of the output unit.

In accordance with a ninth aspect of the present invention, the electric device according to any one of the first to third aspects is configured so that the electronic controller is configured to execute a third control different from the first control and the second control in a case where a third condition that the output of the output unit is greater than or equal to a third threshold is met.

With the electric device according to the ninth aspect, the first control, the second control, and the third control enable the electronic controller to change the communication mode and to perform other different actions based on the output of the output unit.

In accordance with a tenth aspect of the present invention, the electric device according to the ninth aspect is configured so that the second control includes an actuating control in which the electronic controller controls an actuator to move a movable member.

With the electric device according to the tenth aspect, it is possible to move the movable member based on the output of the output unit.

In accordance with an eleventh aspect of the present invention, an electric device of a human-powered vehicle comprises an electronic controller. The electronic controller is configured to execute a second control in a case where a second condition that an output of an output unit is greater than or equal to a second threshold is met. The second control includes an actuating control in which the electronic controller controls an actuator to move a movable member. The electronic controller is configured to execute a third control different from the second control in a case where a third condition that the output of the output unit is greater than or equal to a third threshold is met. The third threshold is different from the second threshold.

With the electric device according to the eleventh aspect, the second control and the third control enable the electronic controller to move the movable member and to perform another action based on the output of the output unit.

In accordance with a twelfth aspect of the present invention, the electric device according to the eleventh aspect further comprises a communicator configured to communicate with an additional communicator in accordance with a communication mode.

With the electric device according to the twelfth aspect, the communicator enables the electronic controller to communicate with the additional communicator.

In accordance with a thirteenth aspect of the present invention, the electric device according to any one of the ninth to twelfth aspects is configured so that the third control includes an obtaining control in which the electronic controller obtains information for adjusting a target stop position of the movable member based on the output of the output unit.

With the electric device according to the thirteenth aspect, it is possible to utilize the information for adjusting the target stop position.

In accordance with a fourteenth aspect of the present invention, the electric device according to any one of the first to thirteenth aspects is configured so that the electronic controller is configured to control the electric device in accordance with an operating mode. The operating mode includes a first mode and a second mode. The electronic controller is configured to execute the first control in a case where the first condition is met in the first mode. The electronic controller is configured to execute the second control in a case where the second condition is met in the second mode.

With the electric device according to the fourteenth aspect, the first mode and the second mode enables the electronic controller to perform at least two different controls.

In accordance with a fifteenth aspect of the present invention, the electric device according to any one of the ninth to thirteenth aspects is configured so that the electronic controller is configured to control the electric device in accordance with an operating mode. The operating mode includes a first mode, a second mode and a third mode. The electronic controller is configured to execute the first control in a case where the first condition is met in the first mode. The electronic controller is configured to execute the second control in a case where the second condition is met in the second mode. The electronic controller is configured to execute the third control in a case where the third condition is met in the third mode.

With the electric device according to the fifteenth aspect, the first mode, the second mode, and the third mode enable the electronic controller to perform at least three different controls.

In accordance with a sixteenth aspect of the present invention, the electric device according to the fourteenth or fifteenth aspect is configured so that the electronic controller is configured to operate with first power consumption in the first mode. The electronic controller is configured to operate with second power consumption in the second mode. The first power consumption is lower than the second power consumption.

With the electric device according to the sixteenth aspect, the first mode can reduce power consumption of the electric device.

In accordance with a seventeenth aspect of the present invention, the electric device according to any one of the first to tenth and twelfth aspects is configured so that the electronic controller is configured to execute the first control to change the communication mode from a first communication mode to a second communication mode in the case where the first condition is met.

With the electric device according to the seventeenth aspect, it is possible to change the communication mode from the first communication mode to the second communication mode based on the first condition.

In accordance with an eighteenth aspect of the present invention, the electric device according to the seventeenth aspect is configured so that the electronic controller is configured to execute a fourth control to change the communication mode from the second communication mode to the first communication mode in a case where a fourth condition that the communicator does not receive a first signal for a first determination time is met.

With the electric device according to the eighteenth aspect, it is possible to change the communication mode from the second communication mode to the first communication mode based on the fourth condition.

In accordance with a nineteenth aspect of the present invention, the electric device according to the seventeenth or eighteenth aspect is configured so that the electronic controller is configured to execute a fifth control different from the first control in a case where a fifth condition which is free of the output of the output unit is met in the second communication mode.

With the electric device according to the nineteenth aspect, the fifth condition enables the electronic controller to avoid impact of the output of the output unit on the fifth control.

In accordance with a twentieth aspect of the present invention, the electric device according to the nineteenth aspect is configured so that the fifth condition includes a condition relating to receipt of a second signal transmitted from the additional communicator. The electronic controller is configured to execute the fifth control in a case where the communicator recognizes the second signal transmitted from the additional communicator in the second communication mode.

With the electric device according to the twentieth aspect, it is possible to execute the fifth control using the second signal transmitted from the additional communicator.

In accordance with a twenty-first aspect of the present invention, the electric device according to the nineteenth or twentieth aspect is configured so that the electronic controller is configured to execute the fifth control to change the communication mode from the second communication mode to a third communication mode in a case where the fifth condition is met in the second communication mode.

With the electric device according to the twenty-first aspect, it is possible to utilize the third communication mode based on the fifth condition.

In accordance with a twenty-second aspect of the present invention, the electric device according to the twenty-first aspect is configured so that the electronic controller is configured to execute a sixth control to change the communication mode from the third communication mode to the first communication mode in a case where a sixth condition that the communicator does not receive a third signal for a second determination time is met.

With the electric device according to the twenty-second aspect, it is possible to change the communication mode from the third communication mode to the first communication mode based on the sixth condition.

In accordance with a twenty-third aspect of the present invention, the electric device according to any one of the seventeenth to twenty-second aspects is configured so that the electronic controller is configured to set a reception cycle of the communicator to a first reception cycle in the first communication mode.

With the electric device according to the twenty-third aspect, it is possible to change power consumption of the communicator using the first reception cycle.

In accordance with a twenty-fourth aspect of the present invention, the electric device according to the twenty-third aspect is configured so that the electronic controller is configured to set a reception cycle of the communicator to a second reception cycle in the second communication mode.

With the electric device according to the twenty-fourth aspect, it is possible to change power consumption of the communicator using the second reception cycle.

In accordance with a twenty-fifth aspect of the present invention, the electric device according to the twenty-fourth aspect is configured so that the second reception cycle is shorter than the first reception cycle.

With the electric device according to the twenty-fifth aspect, it is possible to reduce power consumption of the communicator using the first reception cycle.

In accordance with a twenty-sixth aspect of the present invention, the electric device according to any one of the first to twenty-fifth aspects is configured so that the output unit includes at least one of a vibration sensor, an acceleration sensor and a motion sensor.

With the electric device according to the twenty-sixth aspect, it is possible to utilize an output of at least one of the vibration sensor, the acceleration sensor and the motion sensor.

In accordance with a twenty-seventh aspect of the present invention, the electric device according to any one of the first to twenty-sixth aspects is configured so that the output unit is configured to transmit a first output signal to the electronic controller in the case where the first condition is met. The output unit is configured to transmit a second output signal to the electronic controller in the case where the second condition is met.

With the electric device according to the twenty-seventh aspect, it is possible to utilize the output unit to determine the first condition and the second condition.

In accordance with a twenty-eighth aspect of the present invention, the electric device according to the twenty-seventh aspect is configured so that the electronic controller is configured to execute the first control in response to the first output signal. The electronic controller is configured to execute the second control in response to the second output signal.

With the electric device according to the twenty-eighth aspect, it is possible to reduce power consumption of the electronic controller using the output unit.

In accordance with a twenty-ninth aspect of the present invention, the electric device according to any one of the first to twenty-eighth aspects further comprises a rotational shaft and a position sensor. The electronic controller is configured to obtain a rotational position of the rotational shaft based on an output of the position sensor.

With the electric device according to the twenty-ninth aspect, it is possible to recognize a position of another member using the rotational position of the rotational shaft.

In accordance with a thirtieth aspect of the present invention, an electric device of a human-powered vehicle comprises a rotational shaft, a position sensor, and an electronic controller. The position sensor is configured to sense a rotational position of the rotational shaft. The electronic controller is configured to change a power state of the position sensor from a first power state to a second power state in a case where acceleration sensed by a sensor is greater than or equal to a second threshold.

With the electric device according to the thirtieth aspect, it is possible to change the power state of the position sensor using the acceleration. Thus, it is possible to shorten periods of use of the position sensor, saving power consumption of the electric device.

In accordance with a thirty-first aspect of the present invention, the electric device according to the twenty-ninth or thirtieth aspect is configured so that the rotational shaft is provided on a power transmission path defined from an actuator to a movable member configured to be moved by the actuator.

With the electric device according to the thirty-first aspect, it is possible to recognize a motion of the movable member using a motion of the rotational shaft.

In accordance with a thirty-second aspect of the present invention, the electric device according to the thirtieth or thirty-first aspect is configured so that the electronic controller is configured to change the power state of the position sensor from the second power state to the first power state in a case where acceleration sensed by the sensor is smaller than the second threshold.

With the electric device according to the thirty-second aspect, it is possible to reduce power consumption of the position sensor.

In accordance with a thirty-third aspect of the present invention, the electric device according to any one of the thirtieth to thirty-second aspects is configured so that the electronic controller is configured to execute an actuating control in which the electronic controller controls the actuator to move a movable member to a target stop position in a case where a position of the movable member is offset from the target stop position.

With the electric device according to the thirty-third aspect, it is possible to move the movable member to the target position in the state where the position of the movable member is offset from the target position.

In accordance with a thirty-fourth aspect of the present invention, the electric device according to any one of the thirtieth to thirty-third aspects further comprises a communicator configured to communicate with an additional communicator in accordance with a communication mode.

With the electric device according to the thirty-fourth aspect, the communicator enables the electronic controller to communicate with the additional communicator.

In accordance with a thirty-fifth aspect of the present invention, the electric device according to any one of the first to tenth, twelfth, sixteenth to twenty-fifth, and thirty-fourth aspects is configured so that the communicator includes a wireless communicator configured to wirelessly communicate with the additional communicator.

With the electric device according to the thirty-fifth aspect, the wireless communicator enables the electronic controller to wirelessly communicate with the additional communicator.

In accordance with a thirty-sixth aspect of the present invention, a derailleur comprises a base member, a movable member, and the electric device according to any one of the first to thirty-fifth aspects. The base member is mountable to a human-powered vehicle. The movable member is movably coupled to the base member.

With the electric device according to the thirty-sixth aspect, it is possible to apply the electric device to the derailleur.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
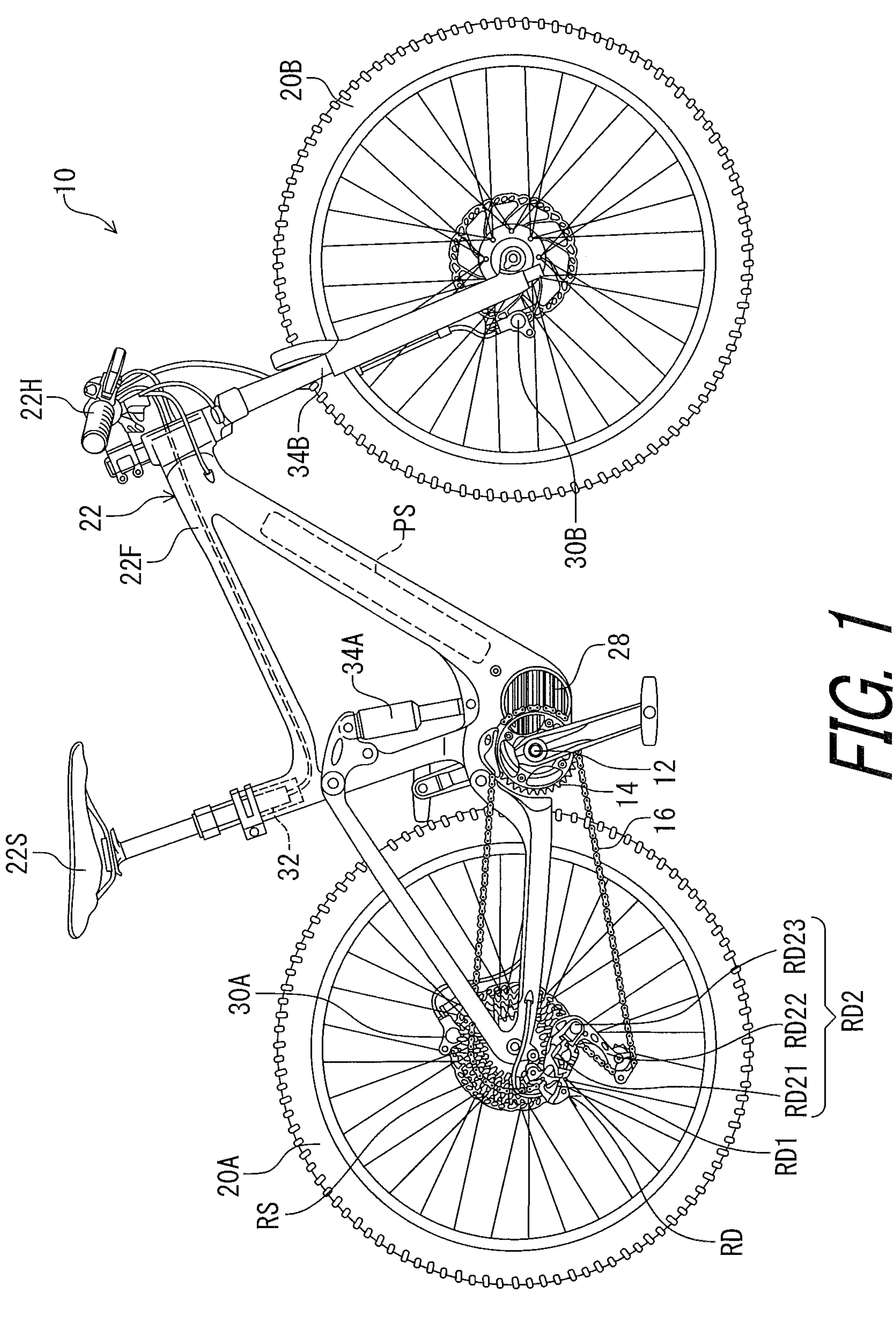
FIG. 1 is a side elevational view of a human-powered vehicle including a derailleur in accordance with one of embodiments.

The embodiments will now be described with reference to the accompanying drawings, wherein like reference numerals designate corresponding or identical elements throughout the various drawings.

As seen in FIG. 1, a human-powered vehicle 10 includes a derailleur RD in accordance with one of embodiments. The human-powered vehicle 10 includes a crank 12, a sprocket 14, a chain 16, a sprocket assembly RS, a wheel 20A, a wheel 20B, and a vehicle body 22. The crank 12 is rotatably coupled to the vehicle body 22. The crank 12 is rotatable relative to the vehicle body 22 during pedaling. The sprocket 14 is coupled to the crank 12. The sprocket assembly RS is rotatably coupled to the vehicle body 22. The chain 16 is engaged with the sprocket 14 and the sprocket assembly RS. The sprocket assembly RS is coupled to the wheel 20A to transmit a pedaling force from the crank 12 to the wheel 20A via sprocket 14 and the chain 16.

The human-powered vehicle 10 includes, for example, an operating device 24, a drive unit 28, a brake device 30, an adjustable seatpost 32, a suspension 34, a display device 36, a sensor 38, a sensor 40, a sensor 42, an electric power source PS, and a power generator 44. The vehicle body 22 includes, for example, a frame 22F, a handlebar 22H, and a saddle 22S.

The operating device 24 is configured to receive a user input and is mounted to the handlebar 22H. The operating device 24 is configured to operate at least one of the derailleur RD, the drive unit 28, the brake device 30, the adjustable seatpost 32, the suspension 34, the display device 36, the sensor 38, the sensor 40, and the sensor 42 in response to the user input. The operating device 24 can be mounted to parts other than the handlebar 22H if needed or desired. At least one of the sensors 38, 40, and 42 can be included in an output unit described later.

The operating device 24 is configured to generate a signal to control a component of the human-powered vehicle 10. The operating device 24 includes at least one of a button, a dial, and a lever. The operating device 24 can include a single operating device or at least two separate operating devices.

The derailleur RD is configured to change a gear ratio of the human-powered vehicle 10. The gear ratio is a ratio of a rotational speed of the wheel 20A to a rotational speed of the wheel 20B. The derailleur RD is configured to change the gear ratio in response to a control signal generated by the operating device 24.

The drive unit 28 is configured to assist propulsion of the human-powered vehicle 10. The drive unit 28 is mountable to the vehicle body. The drive unit 28 is configured to change an assist ratio depending on a human power applied to the human-powered vehicle 10. The drive unit 28 includes an actuator. Examples of the actuator includes an electric motor. The drive unit 28 is configured to change the assist ratio which is a ratio of a driving force of the actuator to the human power applied to the human-powered vehicle 10 in response to a control signal generated by the operating device 24.

The brake device 30A is configured to apply a braking force to the human-powered vehicle 10. The brake device 30A is mountable to the vehicle body 22. The brake device 30A is configured to apply braking force to the wheel 20A. The brake device 30A includes an electric brake device. The brake device 30A includes an actuator. Examples of the actuator includes an electric motor. The actuator of the brake device 30A is configured to change the braking force depending on a control signal generated by the operating device 24.

The brake device 30B is configured to apply a braking force to the human-powered vehicle 10. The brake device 30B is mountable to the vehicle body 22. The brake device 30B is configured to apply braking force to the wheel 20A. The brake device 30B includes an electric brake device. The brake device 30B includes an actuator. Examples of the actuator includes an electric motor. The actuator of the brake device 30B is configured to change the braking force depending on a control signal generated by the operating device 24.

The adjustable seatpost 32 is configured to change a height of the saddle 22S relative to the frame 22F. The adjustable seatpost 32 is mountable to the human-powered vehicle 10. The adjustable seatpost 32 includes an electric adjustable seatpost. The adjustable seatpost 32 includes an actuator. Examples of the actuator include an electric motor. The adjustable seatpost 32 is configured to change the height of the saddle 22S relative to the frame 22F in response to a control signal generated by the operating device 24.

The suspension 34A is configured to absorb shocks and vibrations generated by riding on rough terrain. The suspension 34A is coupled to the vehicle body 22. The suspension 34A includes an electric suspension. The suspension 34A can include a spring suspension, a hydraulic suspension, and an air suspension. The suspension 34A couples the wheel 20A and the vehicle body 22 to absorb shocks and vibrations applied to the wheel 20A.

The suspension 34B is configured to absorb shocks and vibrations generated by riding on rough terrain. The suspension 34B is coupled to the vehicle body 22. The suspension 34B includes an electric suspension. The suspension 34B can include a spring suspension, a hydraulic suspension, and an air suspension. The suspension 34B couples the wheel 20B and the vehicle body 22 to absorb shocks and vibrations applied to the wheel 20B.

Figure 2:
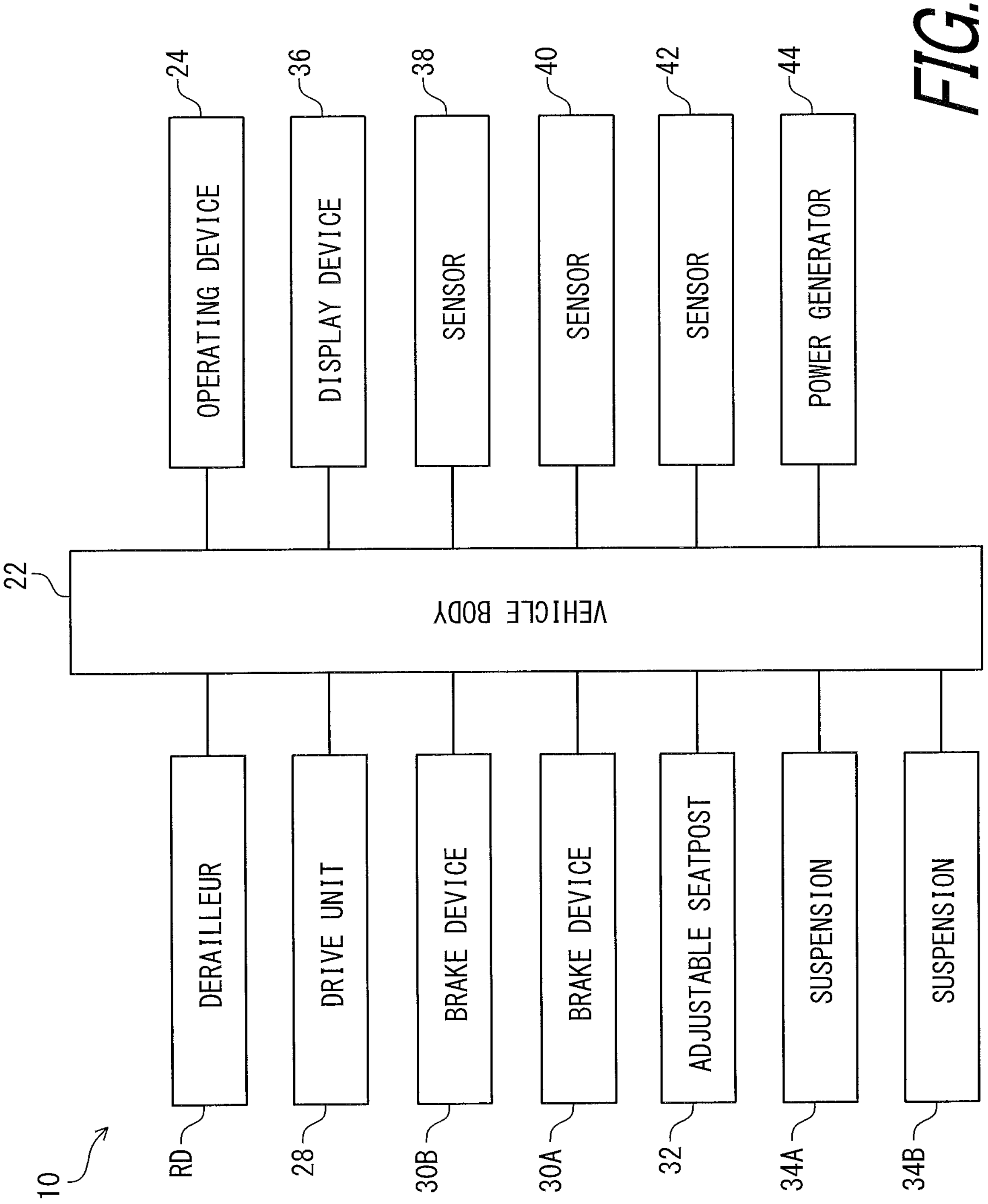
FIG. 2 is a schematic block diagram of the human-powered vehicle illustrated in FIG. 1.

As seen in FIG. 2, the display device 36 is configured to display information relating to the human-powered vehicle 10. The display device 36 is coupled to the vehicle body 22. For example, the display device 36 is coupled to the handlebar 22H. The display device 36 is configured to receive the information relating to the human-powered vehicle 10 from a component of the human-powered vehicle 10. The display device 36 can be detachably coupled to the vehicle body 22 if needed or desired. The display device 36 can include at least one of a smartphone, a cyclocomputer, and a tablet computer.

The sensor 38 is configured to obtain information relating to rotation of the crank 12. The sensor 38 includes a sensing object and a sensor body. The sensing object is coupled to one of the vehicle body 22 and the crank 12. The sensor body is coupled to the other of the vehicle body 22 and the crank 12. The sensor body is configured to sense rotation of the sensing object to obtain the information relating to the rotation of the crank 12.

The sensor 40 is configured to sense a human power applied to the human-powered vehicle 10. For example, the sensor 40 includes a strain gauge configured to sense strain of the human-powered vehicle 10. The sensor 40 is provided to the crank 12. The sensor 40 is configured to sense strain of the crank 12. The sensor 40 can be provided to another part such as the wheel 20A, the wheel 20B, and the vehicle body 22.

The sensor 42 is configured to sense air pressure of at least one of the wheels 20A and 20B. The sensor 42 is provided to at least one of air valves of the wheels 20A and 20B.

The electric power source PS is configured to supply electricity to at least one of the operating device 24, the derailleur RD, the drive unit 28, the brake device 30, the adjustable seatpost 32, the suspension 34, the display device 36, the sensor 38, the sensor 40, and the sensor 42. For example, the electric power source PS includes a battery. The electric power source PS is at least partially provided in the vehicle body 22. However, the electric power source PS can be entirely provided outside the vehicle body 22 if needed or desired.

The power generator 44 is provided to at least one of hubs of the wheels 20A and 20B. The power generator 44 is configured to convert rotation of at least one of the wheels 20A and 20B into electricity. The power generator 44 is configured to supply electricity to at least one of the operating device 24, the derailleur RD, the drive unit 28, the brake device 30, the adjustable seatpost 32, the suspension 34, the display device 36, the sensor 38, the sensor 40, and the sensor 42. The power generator 44 can be configured to charge the electric power source PS or another electric power source.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of the user who is in the user's standard position in the human-powered vehicle 10 with facing a handlebar or steering. Examples of the user's standard position include a saddle and a seat. Accordingly, these terms, as utilized to describe the electric device 50, the derailleur RD, the derailleur FD, or other components, should be interpreted relative to the human-powered vehicle 10 equipped with the electric device 50, the derailleur RD, the derailleur FD, or other components as used in an upright riding position on a horizontal surface.

Figure 3:
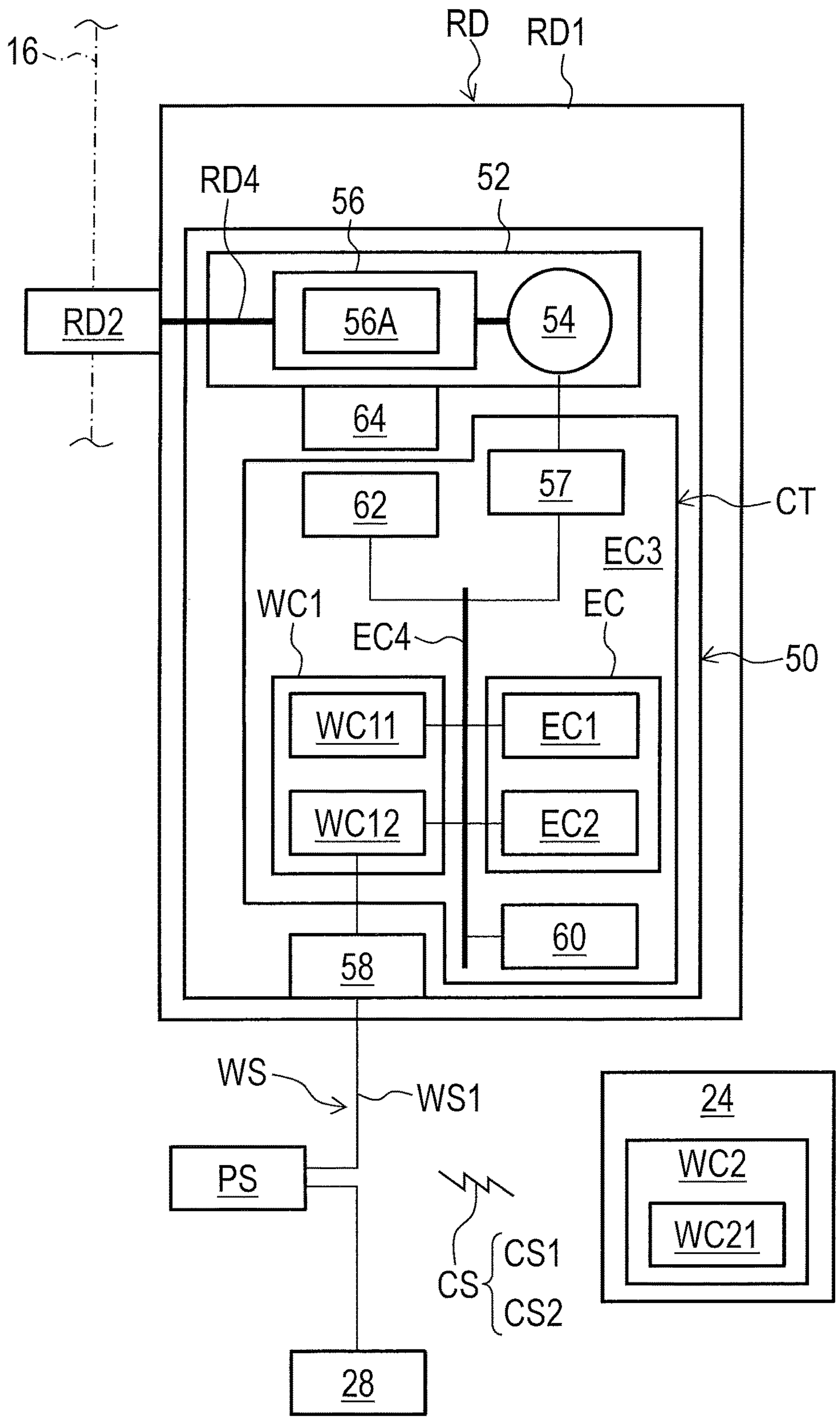
FIG. 3 is a schematic block diagram of the human-powered vehicle illustrated in FIG. 1.

As seen in FIG. 3, the derailleur RD comprises a base member RD1 and a movable member RD2. The base member RD1 is mountable to the human-powered vehicle 10. The movable member RD2 is movably coupled to the base member RD1. The base member RD1 member is configured to be coupled to the vehicle body 2A of the human-powered vehicle 10. The movable member RD2 is contactable with the chain 16. The movable member RD2 is configured to move the chain 16 relative to the sprocket assembly RS (see e.g., FIG. 1). For example, the movable member RD2 includes a linkage RD21, a chain guide RD22, and a movable body RD23. The chain guide RD22 is movable relative to the base member RD1. The chain guide RD22 is pivotally coupled to the movable body RD23. The movable body RD23 is pivotally coupled to the linkage RD21. The movable body RD23 is movably coupled to the base member RD1 via the linkage RD21. Thus, the linkage RD21 movably couples the base member RD1 and the chain guide RD22. However, the structure of the movable member RD2 is not limited to the above structure.

The derailleur RD comprises an electric device 50. The electric device 50 includes an actuator 52. The actuator 52 is operatively coupled to the movable member RD2. The actuator 52 is configured to move the movable member RD2 using electricity supplied from the electric power source PS. The actuator 52 is coupled to the movable member RD2 to move the movable member RD2 relative to the base member RD1 using the electricity supplied from the electric power source PS. The electric device 50 can be provided to another device such as the derailleur FD, the drive unit 28, the adjustable seatpost 32, the suspension 34, or an internal gear changer if needed or desired. For example, the internal gear changer is provided in a hub assembly of the wheel 20A.

The actuator 52 includes an electric motor 54, a gear structure 56, and an output member RD4. The electric motor 54 is configured to generate rotational force and is coupled to the gear structure 56. The gear structure 56 couples the electric motor 54 and the movable member RD2 to transmit the rotational force from the electric motor 54 to the movable member RD2. The gear structure 56 includes a rotational shaft 56A. Namely, the electric device 50 of the human-powered vehicle 10 comprises the rotational shaft 56A. The output member RD4 is coupled to the movable member RD2 to transmit the rotational force to the movable member RD2. The output member RD4 couples the gear structure 56 and the movable member RD2 to transmit the rotational force from the gear structure 56 to the movable member RD2. For example, the output member RD4 includes an output shaft coupled to the movable member RD2 and an output gear of the gear structure 56. The rotational shaft 56A can be the output member RD4 if needed or desired.

In the present embodiment, the rotational shaft 56A is provided on a power transmission path defined from the actuator 52 to the movable member RD2 configured to be moved by the actuator 52. However, the rotational shaft 56A can be provided outside the power transmission path defined from the actuator to the movable member RD2 if needed or desired.

The electric device 50 includes an actuator driver 57. The actuator driver 57 is electrically connected to the actuator 52 to control the actuator 52. The actuator driver 57 is electrically connected to the electric motor 54 to control the electric motor 54.

The electric device 50 of the human-powered vehicle 10 comprises an electric circuitry CT. The electric circuitry CT includes an electronic controller EC. Namely, the electric device 50 of the human-powered vehicle 10 comprises an electronic controller EC. The electronic controller EC is configured to control the actuator 52 to move the output member RD4 based on control information. The electronic controller EC is electrically connected to the actuator 52 to control the actuator 52 based on the control information. The electronic controller EC is electrically connected to the actuator driver 57 to control the actuator 52 via the actuator driver 57 based on the control information. For example, the control information includes a control signal CS transmitted from the operating device 24. The electronic controller EC is configured to control the actuator 52 to move the output member RD4 based on the control signal CS transmitted from the operating device 24.

The control signal CS includes a first control signal CS1 and a second control signal CS2. The operating device 24 is configured to transmit the first control signal CS1 in response to a first user input. The operating device 24 is configured to transmit the second control signal CS2 in response to a first user input. For example, the first control signal CS1 indicates one of upshifting and downshifting of the derailleur RD. The second control signal CS2 indicates the other of upshifting and downshifting of the derailleur RD.

The electronic controller EC includes a hardware processor EC1 and a hardware memory EC2. The electric circuitry CT includes a circuit board EC3 and a system bus EC4. The hardware processor EC1 is coupled to the hardware memory EC2. The hardware memory EC2 is coupled to the hardware processor EC1. The hardware processor EC1 and the hardware memory EC2 are electrically mounted on the circuit board EC3. The hardware processor EC1 is electrically connected to the hardware memory EC2 via circuit board EC3 and the system bus EC4. The hardware memory EC2 is electrically connected to the hardware processor EC1 via circuit board EC3 and the system bus EC4. The system bus EC4 is provided on the circuit board EC3. The actuator driver 57 is electrically mounted on the circuit board EC3. For example, the electronic controller EC includes a semiconductor. The hardware processor EC1 includes a semiconductor. The hardware memory EC2 includes a semiconductor. However, the electronic controller EC can be free of a semiconductor if needed or desired. The hardware processor EC1 can be free of a semiconductor if needed or desired. The hardware memory EC2 can be free of a semiconductor if needed or desired. The actuator driver 57 can be electrically mounted on another circuit board in a case where the electric circuitry CT includes at least two circuit boards. The actuator driver 57 does not need to be electrically mounted on a circuit board.

For example, the hardware processor EC1 includes at least one of a central processing unit (CPU), a micro processing unit (MPU), and a memory controller. The hardware memory EC2 is electrically connected to the hardware processor EC1. For example, the hardware memory EC2 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a hard disc drive (HDD). The hardware memory EC2 includes storage areas each having an address. The hardware processor EC1 is configured to control the hardware memory EC2 to store data in the storage areas of the hardware memory EC2 and reads data from the storage areas of the hardware memory EC2. The hardware memory EC2 can also be referred to as a computer-readable storage medium EC2.

The electronic controller EC is configured to execute at least one control algorithm of the electric device 50. For example, the electronic controller EC is programed to execute at least one control algorithm of the electric device 50. The hardware memory EC2 stores at least one program including at least one program instruction. The at least one program is read into the hardware processor EC1, and thereby the at least one control algorithm of the electric device 50 is executed based on the at least one program. The electronic controller EC can also be referred to as an electronic controller circuit or circuitry EC. The electronic controller EC can also be referred to as an electronic hardware controller circuit or circuitry EC.

The structure of the electric circuitry CT is not limited to the above structure. The structure of the electronic controller EC is not limited to the above structure. The structure of the electronic controller EC is not limited to the hardware processor EC1 and the hardware memory EC2. The electric circuitry CT can be realized by hardware alone or a combination of hardware and software. In the present embodiment, the hardware processor EC1 and the hardware memory EC2 are integrated as a one chip such as an application specific integrated circuit (ASIC) or a field programmable gate array (FPGA). However, the hardware processor EC1 and the hardware memory EC2 can be separate chips if needed or desired. The electronic controller EC can include the hardware processor EC1, the hardware memory EC2, the circuit board EC3, and the system bus EC4 if needed or desired. The electronic controller EC can be at least two electronic controllers which are separately provided. The electric circuitry CT can include at least two electronic controllers which are separately provided. The at least one control algorithm of the electric device 50 can be executed by the at least two electronic controllers if needed or desired. The electronic controller EC1 can include at least two hardware processors which are separately provided. The electronic controller EC1 can include at least two hardware memories which are separately provided. The at least one control algorithm of the electric device 50 can be executed by the at least two hardware processors if needed or desired. The at least one control algorithm of the electric device 50 can be stored in the at least two hardware memories if needed or desired. The electric circuitry CT can include at least two circuit boards which are separately provided if needed or desired. The electric circuitry CT can include at least two system buses which are separately provided if needed or desired.

The electric device 50 of the human-powered vehicle 10 comprises a communicator WC1. The communicator WC1 is configured to communicate with an additional communicator in accordance with a communication mode. Examples of the additional communicator include a communicator of the operating device 24. In the present embodiment, the operating device 24 includes an additional communicator WC2. The communicator WC1 is configured to receive a signal from the additional communicator WC2. The electronic controller EC is electrically connected to the communicator WC1. For example, the communicator WC1 is electrically mounted on the circuit board EC3. However, the communicator WC1 can be electrically mounted on another circuit board in a case where the electric circuitry CT includes at least two circuit boards. The communicator WC1 does not need to be electrically mounted on a circuit board.

In the present embodiment, the communicator WC1 includes a wireless communicator WC11 configured to wirelessly communicate with the additional communicator. The wireless communicator WC11 is configured to wirelessly receive a signal from the additional communicator. The electronic controller EC is electrically connected to the wireless communicator WC11. For example, the wireless communicator WC11 is electrically mounted on the circuit board of the electronic controller EC.

The wireless communicator WC11 is electrically connected to the hardware processor EC1 and the hardware memory EC2 with the circuit board EC3 and the system bus EC4. The wireless communicator WC11 is electrically mounted on the circuit board EC3. The wireless communicator WC11 includes a signal transmitting circuit or circuitry, a signal receiving circuit or circuitry, and an antenna. The wireless communicator WC11 can include a Radio Frequency Integrated Circuit (RFIC). Thus, the wireless communicator WC11 can also be referred to as a wireless communicator circuit or circuitry WC11.

The wireless communicator WC11 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the wireless communicator WC11 is configured to encrypt signals using a cryptographic key to generate encrypted wireless signals. The wireless communicator WC11 is configured to transmit wireless signals via antenna. The wireless communicator WC11 can be a one-way wireless communication device such as a receiver, or a two-way wireless communication device such as a transceiver.

The wireless communicator WC11 is configured to receive wireless signals via antenna. In the present embodiment, the wireless communicator WC11 is configured to decode the wireless signals to recognize signals transmitted from other wireless communicators. The wireless communicator WC11 is configured to decrypt the wireless signals using the cryptographic key.

The additional communicator WC2 has substantially the same structure as the structure of the communicator WC1. The additional communicator WC2 includes an additional wireless communicator WC21. The additional wireless communicator WC21 has substantially the same structure as the structure of the wireless communicator WC11. Thus, it will not be described in detail here for the sake of brevity.

The communicator WC1 includes a wired communicator WC12. The electric device 50 includes a connection port 58 to which an electric cable WS1 of a wired communication structure WS is detachably connected. The wired communicator WC12 is electrically connected to the electronic controller EC, the wireless communicator WC11, the actuator 52, and the connection port 58. The wired communicator WC12 is configured to receive electricity from the electric power source PS via the connection port 58.

The wired communicator WC12 is configured to communicate with an additional wired communicator of an additional component (e.g., an additional wired communicator of the electric power source PS, an additional wired communicator of the drive unit 28) via the wired communication structure WS using power line communication technology. Power line communication (PLC) carries data on a conductor that is also used simultaneously for electric power transmission or electric power distribution to components such as the derailleur RD and the drive unit 28. The wired communicator WC12 can also be referred to as a wired communicator circuit or circuitry WC12.

For example, the wired communication structure WS includes a ground line and a voltage line that are detachably connected to a serial bus that is formed by communication interfaces. In the present embodiment, the wired communicator WC12 is configured to communicate with additional wired communicators of the electric power source PS and the drive unit 28 through the voltage line using the PLC technology. The wired communicator WC12 is configured to superimpose signals on a power source voltage applied from the electric power source PS to the wired communication structure WS. The wired communicator WC12 is configured to receive a signal from the electronic controller EC and is configured to superimpose the signal on the power source voltage. The wired communicator WC12 is configured to separate, from the power source voltage, signals superimposed on the power source voltage of the wired communication structure WS. The wired communicator WC12 is configured to transmit to the electronic controller EC signals separated from the power source voltage. The wired communicator WC12 can be omitted from the electric device 50 in a case where batteries are directly attached to the derailleur RD and the drive unit 28 where the derailleur RD and the drive unit 28 include wired communicators. The connection port 58 can be connected to the electric power source PS via the drive unit 28 if needed or desired. The electric power source PS can be provided to the derailleur RD if needed or desired.

The additional wired communicator of the electric power source PS is provided in the electric power source PS and is configured to communicate with the wired communicator WC12 via the wired communication structure WS using the PLC. The additional wired communicator of the drive unit 28 is configured to communicate with the wired communicator WC12 via the wired communication structure WS using the PLC. Thus, the electronic controller EC is configured to communicate with the electric power source PS and the drive unit 28 via the wired communicator WC12 and the wired communication structure WS using the PLC.

In the present embodiment, the communicator WC1 is a separate member from the electronic controller EC. However, the communicator WC1 can be integrally provided with the electronic controller EC as a one-piece unitary member if needed or desired. The hardware construction of the electric device 50 is not limited to the illustrated embodiment.

The electric device 50 of the human-powered vehicle 10 comprises an output unit 60. The output unit 60 includes at least one of a vibration sensor, an acceleration sensor, and a motion sensor. The output unit 60 can includes at least one of the sensors 38, 40, and 42. In the present embodiment, the output unit 60 includes an acceleration sensor. The output unit 60 is configured to sense acceleration. However, the output unit 60 can include at least one of a vibration sensor, an acceleration sensor, and a motion sensor if needed or desired. The output unit 60 can also be referred to as a sensor 60. The output unit 60 can be at least partially provided in a housing of the electric device 50. The output unit 60 can be at least partially provided outside the housing of the electric device 50. The output unit 60 can be at least partially provided to the derailleur RD. The output unit 60 can be at least partially provided to a device other than the derailleur RD. In the present embodiment, the output unit 60 is electrically mounted on the circuit board EC3. However, the output unit 60 can be electrically mounted on another circuit board in a case where the electric circuitry CT includes at least two circuit boards. The output unit 60 does not need to be electrically mounted on a circuit board.

The electric device 50 of the human-powered vehicle 10 comprises a position sensor 62. The electric device 50 comprises a sensor object 64. The position sensor 62 configured to sense the sensor object 64. The sensor object 64 is configured to be detected by the position sensor 62. The position sensor 62 is configured to sense a position of the sensor object 64. In the present embodiment, the position sensor 62 is electrically mounted on the circuit board EC3. However, the position sensor 62 can be electrically mounted on another circuit board in a case where the electric circuitry CT includes at least two circuit boards. The position sensor 62 does not need to be electrically mounted on a circuit board.

The sensor object 64 is coupled to the rotational shaft 56A to rotate along with the rotational shaft 56A. The position sensor 62 is configured to sense a position of the sensor object 64. The position sensor 62 is configured to sense a rotational position of the rotational shaft 56A. The electronic controller EC is configured to obtain the rotational position of the rotational shaft 56A based on an output of the position sensor 62. Thus, the electronic controller EC is configured to obtain the position PM of the movable member RD2. The position sensor 62 can be configured to sense a rotational position of the output member RD4 in a case where the rotational shaft 56A is the output member RD4.

In the present embodiment, the position sensor 62 includes a non-contact detector and a contact detector. For example, the position sensor 62 can include at least one of an angle sensor, an encoder, and a potentiometer. Examples of the angle sensor include a magneto-resistive sensor. Examples of the encoder include a magnetic sensor and an optical sensor. Examples of the magnetic sensor include a hall sensor. Examples of the optical sensor include a photo sensor. The sensor object 64 includes a magnetic body and a light emitter. Examples of the magnetic body includes a magnet. Examples of the light emitter include a light emitting diode (LED). However, the position sensor 62 can include a contact detector if needed or desired. The sensor object 64 can include parts other than magnetic body or the light emitter. In a case where the position sensor 62 includes a magnetic sensor, for example, the magnetic sensor is electrically mounted on the circuit board EC3, and the sensor object 64 includes a magnet coupled to the rotational shaft 56A to rotate integrally with the rotational shaft 56A.

The electronic controller EC is electrically connected to the position sensor 62 to calculate a rotational angle of the sensor object 64 based on a detection result of the position sensor 62. For example, the electronic controller EC is configured to calculate an absolute rotational angle of the sensor object 64 based on the detection result of the position sensor 62. The position sensor 62 can be electrically mounted on the circuit board EC3. The position sensor 62 can be attached to the rotational shaft 56A and electrically connected to the electronic controller EC.

Figure 4:
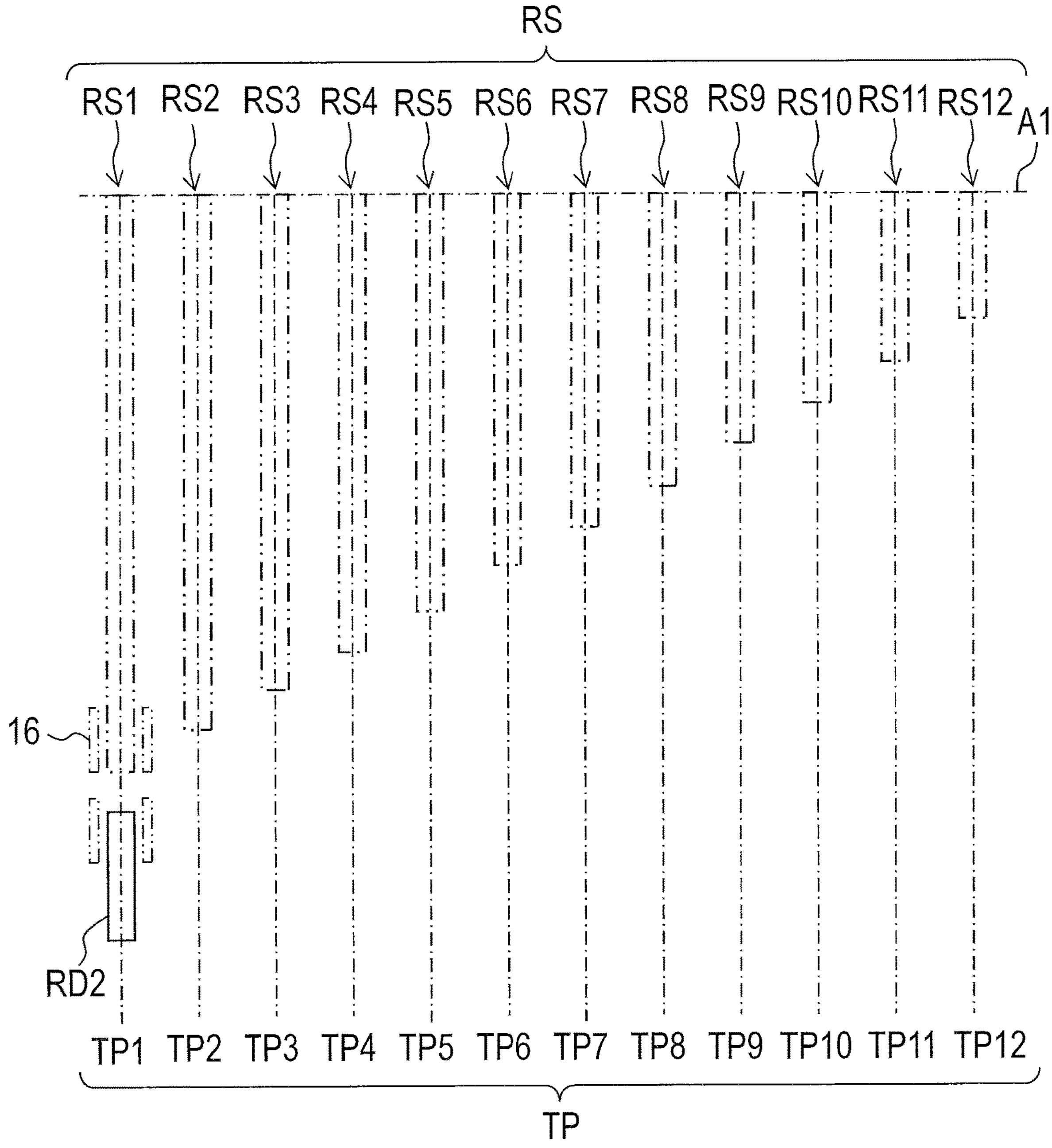
FIG. 4 is a schematic view of a sprocket assembly of the derailleur illustrated in FIG. 1.

As seen in FIG. 4, the derailleur RD has a plurality of target stop positions TP1 to TP12. The electronic controller EC is configured to control the actuator 52 to selectively stop the movable member RD2 in each of the target stop positions TP1 to TP12. The sprocket assembly RS includes a plurality of sprockets RS1 to RS12. The sprocket assembly RS is rotatable about a rotational axis A1. The sprocket RS1 has the largest outer diameter among the plurality of sprockets RS1 to RS12 and corresponds to a low gear of the sprocket assembly RS. The sprocket RS12 has the smallest outer diameter among the plurality of sprockets RS1 to RS12 and corresponds to a top gear of the sprocket assembly RS. The target stop positions TP1 to TP12 of the movable member RD2 respectively correspond to the sprockets RS1 to RS12 of the sprocket assembly RS. Each of the target stop positions TP1 to TP12 can also be referred to as a target stop position TP. The electronic controller EC stores the target stop positions TP1 to TP12 in the hardware memory EC2.

Figure 5:
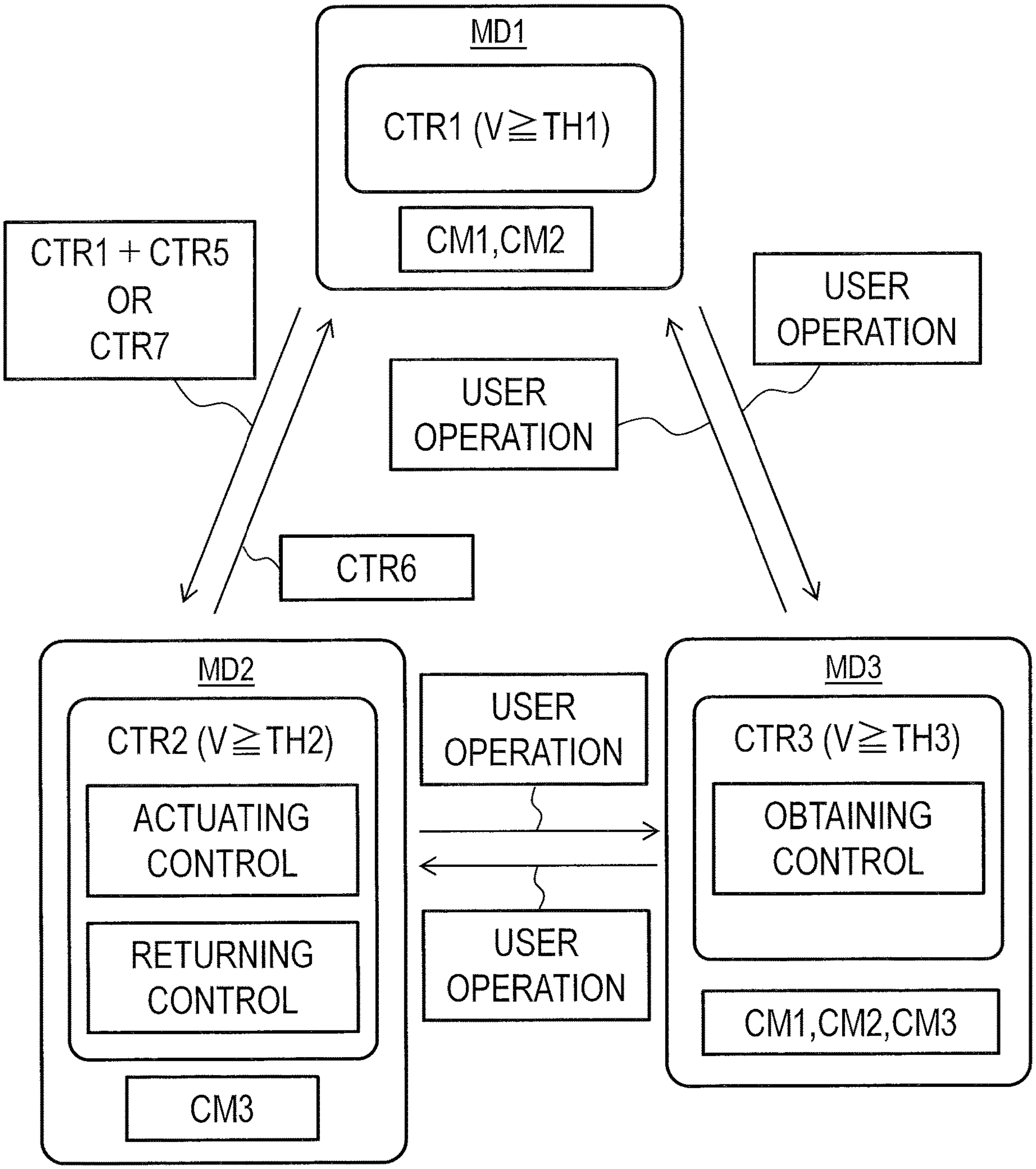
FIG. 5 is a schematic block diagram showing modes and states of an electric device of the derailleur illustrated in FIG. 1.

As seen in FIG. 5, the electric device 50 has an operating mode. The electronic controller EC is configured to control the electric device 50 in accordance with the operating mode. The operating mode includes a first mode MD1 and a second mode MD2. The operating mode includes a third mode MD3. The electronic controller EC is configured to operate with first power consumption in the first mode MD1. The electronic controller EC is configured to operate with second power consumption in the second mode MD2. The electronic controller EC is configured to operate with third power consumption in the third mode MD3.

In the present embodiment, the first power consumption is lower than second power consumption. The first power consumption is lower than the third power consumption. The second power consumption is lower than the third power consumption. However, the second power consumption can be higher than or equal to the third power consumption if needed or desired.

Figure 6:
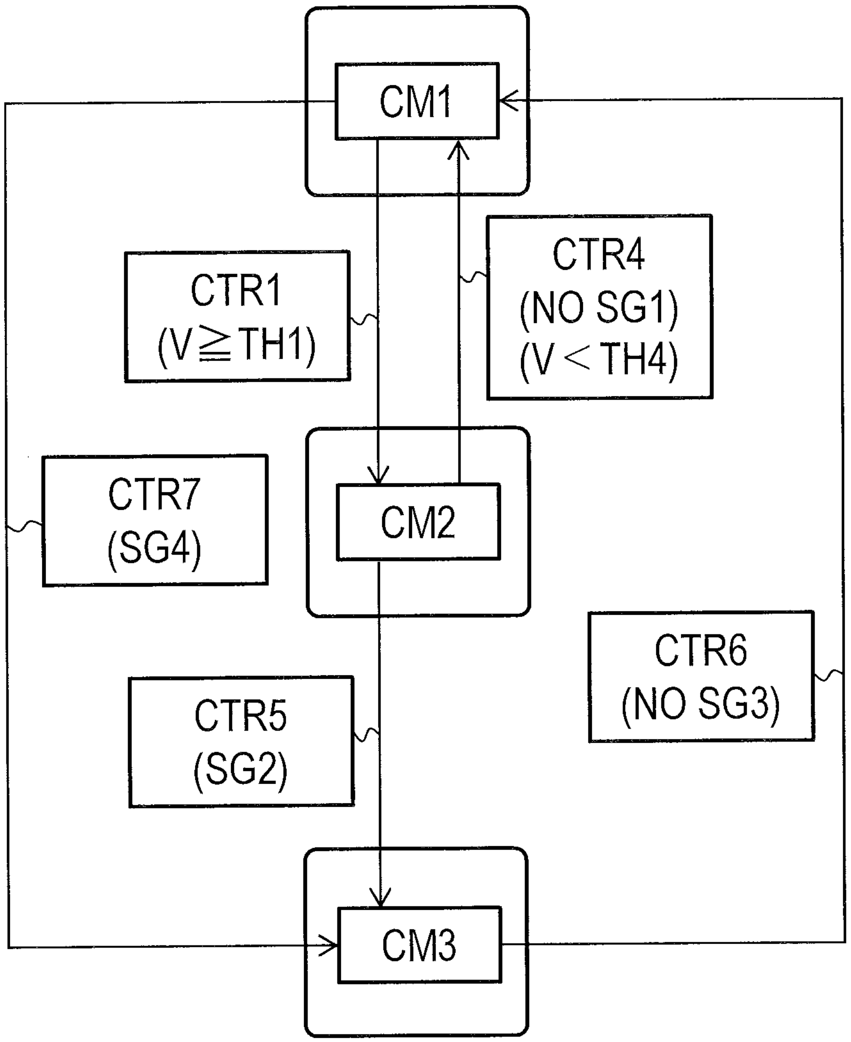
FIG. 6 is a schematic block diagram showing communication modes of the electric device of the derailleur illustrated in FIG. 1.

As seen in FIG. 6, the electric device 50 has a first communication mode CM1, a second communication mode CM2, and a third communication mode CM3. The electronic controller EC is configured to set a reception cycle of the communicator WC1 to a first reception cycle RC1 in the first communication mode CM1. The electronic controller EC is configured to set a reception cycle of the communicator WC1 to a second reception cycle RC2 in the second communication mode CM2.

Figure 7:
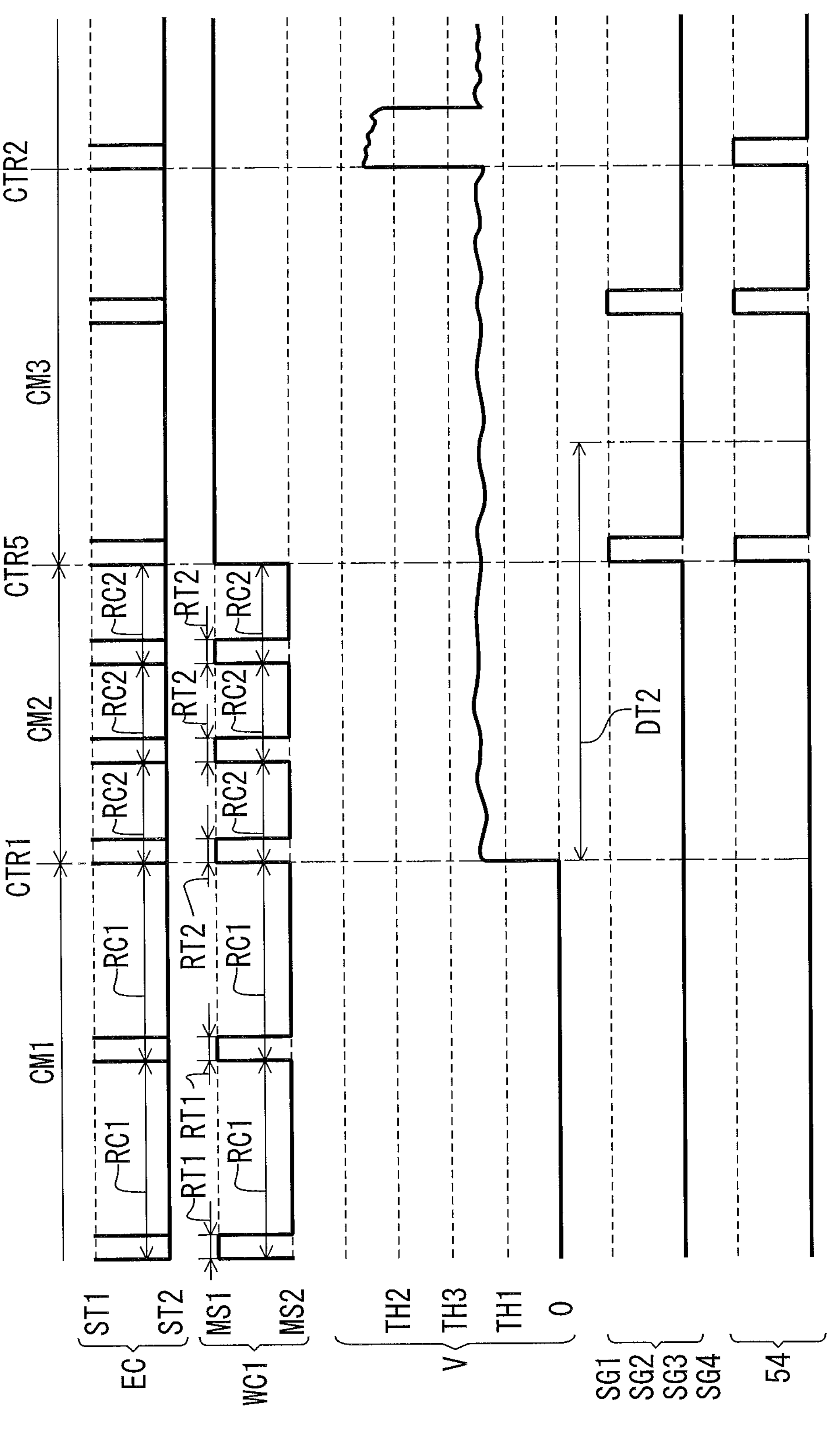
FIG. 7 is a timing chart showing modes and states of an electric device of the derailleur illustrated in FIG. 1.

As seen in FIG. 7, the communicator WC1 has a first communication state MS1 and a second communication state MS2. The communicator WC1 has first sensitivity in the first communication state MS1. The communicator WC1 has second sensitivity in the second communication state MS2. The second sensitivity is lower than first sensitivity. For example, the communicator WC1 is configured to detect signals in the first communication state MS1. The communicator WC1 is configured not to detect signals in the second communication state MS2. The communicator WC1 is turned on in the first communication state MS1. The communicator WC1 is turned off in the second communication state MS2.

The electronic controller EC has a first control state ST1 and a second control state ST2. The electronic controller EC is configured to operate with fourth power consumption in the first control state ST1. The electronic controller EC is configured to operate with fifth power consumption in the second control state ST2. The fifth power consumption is lower than the fourth power consumption. For example, the electronic controller EC turns on in the first control state ST1. The electronic controller EC is configured to turn off at least partially in the second control state ST2.

In the first control state ST1, the electronic controller EC is configured to change the state of the communicator WC1 between the first communication state MS1 and the second communication state MS2. In the first control state ST1, the electronic controller EC is configured to change the state of the communicator WC1 from the second communication state MS2 to the first communication state MS1. In the first control state ST1, the electronic controller EC is configured to change the state of the communicator WC1 from the first communication state MS1 to the second communication state MS2.

In the first control state ST1, the electronic controller EC is configured to change a state of the communicator WC1 from the second communication state MS2 to the first communication state MS1 and maintain the first communication state MS1 for a first reception time RT1. In the first control state ST1, the electronic controller EC is configured to change the state of the communicator WC1 from the first communication state MS1 to the second communication state MS2 after the first reception time RT1 elapses. In the first control state ST1, the electronic controller EC is configured to repeatedly change the state of the communicator WC1 between the first communication state MS1 and the second communication state MS2 at the first reception cycle RC1 in the first communication mode CM1. However, the electronic controller EC can be configured to maintain the second communication state MS2 without the first communication state MS1 during the first communication mode CM1 if needed or desired.

In the first control state ST1, the electronic controller EC is configured to change a state of the communicator WC1 from the second communication state MS2 to the first communication state MS1 and maintain the first communication state MS1 for a second reception time RT2. In the first control state ST1, the electronic controller EC is configured to change the state of the communicator WC1 from the first communication state MS1 to the second communication state MS2 after the second reception time RT2 elapses. In the first control state ST1, the electronic controller EC is configured to repeatedly change the state of the communicator WC1 between the first communication state MS1 and the second communication state MS2 at the second reception cycle RC2 in the second communication mode CM2.

In the second control state ST2, the electronic controller EC is configured to reduce the power consumption to the fifth power consumption. The electronic controller EC is configured not to generate the wake signal in the second control state ST2. Instead, in the second control state ST2, the electronic controller EC is configured to change the state of the electronic controller EC from the second control state ST2 to the first control state ST1 in response to the output V of the output unit 60. The electronic controller EC is configured to turn on in response to the output V of the output unit 60 in the second control state ST2.

In the present embodiment, the second reception cycle RC2 is shorter than first reception cycle RC1. For example, the first reception cycle RC1 is 60 seconds. The second reception cycle RC2 is 1.5 seconds. The first reception time RT1 is equal to the second reception time RT2. However, the first reception time RT1 can be different from the second reception time RT2 if needed or desired.

The electronic controller EC is configured to continuously maintain the first communication state MS1 in the third communication mode CM3. The electronic controller EC is configured to continuously turn the communicator WC1 on in the third communication mode CM3. However, the electronic controller EC can be configured to set the reception cycle of the communicator WC1 to a third reception cycle in the third communication mode CM3 if needed or desired. In such modifications, the third reception cycle is longer than first reception cycle RC1 and the second reception cycle RC2. Furthermore, the third communication mode CM3 can be the same as the first communication mode CM1 or the second communication mode CM2 if needed or desired.

As seen in FIG. 5, in the present embodiment, the electronic controller EC is configured to execute the first control CTR1 in the first communication mode CM1 or the second communication mode CM2. The electronic controller EC is configured to execute the second control CTR2 in the third communication mode CM3. The electronic controller EC is configured to execute the third control CTR3 in the first communication mode CM1, the second communication mode CM2, or the third communication mode CM3. However, the relationship between the first control CTR1, the second control CTR2, the third control CTR3, the first communication mode CM1, the second communication mode CM2, and the third communication mode CM3 is not limited to the illustrated embodiment.

Figure 8:
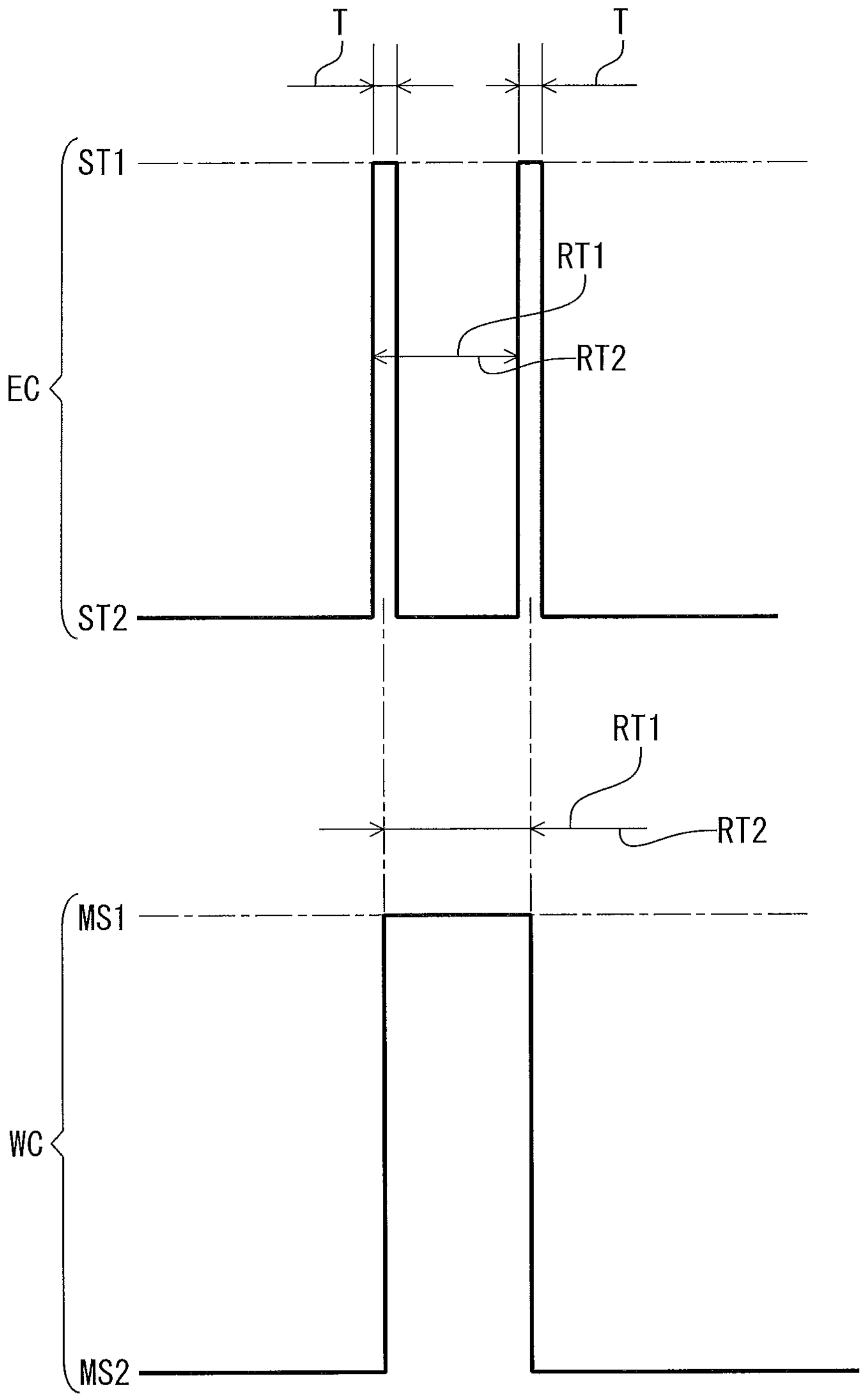
FIG. 8 is a timing chart showing reception cycles and reception times of the electric device of the derailleur illustrated in FIG. 1.

As seen in FIGS. 7 and 8, in the present embodiment, the electronic controller EC is configured to change the state of the electronic controller EC from the first control state ST1 to the second control state ST2, to change the state of the communicator WC1 from the second communication state MS2 to the first communication state MS1, and to change the state of the electronic controller EC from the second control state ST2 to the first control state ST1. The electronic controller EC is configured to change the state of the electronic controller EC from the first control state ST1 to the second control state ST2, to change the state of the communicator WC1 from the first communication state MS1 to the second communication state MS2, and to change the state of the electronic controller EC from the second control state ST2 to the first control state ST1. In the first communication mode CM1, the electronic controller EC repeatedly executes the above action at the first reception cycle RC1. In the second communication mode CM2, the electronic controller EC repeatedly executes the above action at the second reception cycle RC2. A time T for which the electronic controller EC is in the first control state ST1 is shorter than the first reception time RT1 and the second reception time RT2. However, the time T for which the electronic controller EC is in the first control state ST1 can be longer than or equal to at least one of the first reception time RT1 and the second reception time RT2 if needed or desired.

As seen in FIGS. 5 to 7, the electronic controller EC is configured to execute a first control CTR1 to change the communication mode in a case where a first condition that the output V of the output unit 60 is greater than or equal to a first threshold TH1 is met. The electronic controller EC is configured to execute the first control CTR1 in a case where the first condition is met in the first mode MD1. The electronic controller EC is configured to execute the first control CTR1 to change the communication mode from the first communication mode CM1 to the second communication mode CM2 in the case where the first condition is met.

For example, the output V of the output unit 60 includes acceleration. The electronic controller EC is configured to execute the first control CTR1 to change the communication mode in a case where the first condition that the acceleration sensed by the output unit 60 is greater than or equal to the first threshold TH1 is met. The electronic controller EC is configured to change the communication mode from the first communication mode CM1 to the second communication mode CM2 in a case where the output V of the output unit 60 is greater than or equal to the first threshold TH1 in the first mode MD1.

As seen in FIGS. 5 to 7, the electronic controller EC is configured to execute a second control CTR2 in a case where a second condition that the output V of the output unit 60 is greater than or equal to the second threshold TH2 is met. The electronic controller EC is configured to execute the second control CTR2 in a case where the second condition is met in the second mode MD2. The electronic controller EC is configured to execute the second control CTR2 different from the first control CTR1 in a case where the second condition that the output V of the output unit 60 is greater than or equal to the second threshold TH2 is met. The electronic controller EC is configured to execute the second control CTR2 different from the first control CTR1 in a case where the second condition that the acceleration sensed by the output unit 60 is greater than or equal to the second threshold TH2 is met.

In the present embodiment, the second threshold TH2 is different from the first threshold TH1. The second threshold TH2 is greater than first threshold TH1. The first threshold TH1 ranges from 0.1 G to 0.5 G. The second threshold TH2 ranges from 2 G to 40 G. For example, the first threshold TH1 is 0.2 G. The second threshold TH2 is 30 G. However, each of the first threshold TH1 and the second threshold TH2 is not limited to the above value and range.

The electronic controller EC is configured to execute a gear changing operation in response to receipt of the control signal CS from the additional communicator WC2. The second control CTR2 includes a control to operate the position sensor 62.

Figure 9:
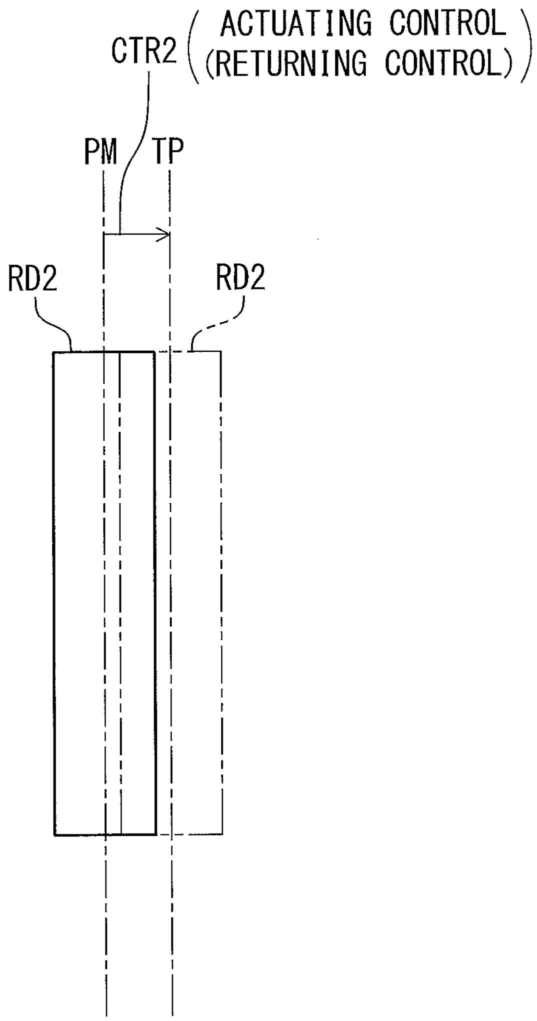
FIG. 9 is a schematic diagram showing a relationship between a target position and a movable member of the derailleur illustrated in FIG. 1.

As seen in FIGS. 5 and 9, the second control CTR2 includes an actuating control in which the electronic controller EC controls the actuator 52 to move the movable member RD2. In the actuating control, the electronic controller EC controls the actuator 52 to move the movable member RD2 to the target stop position TP. The electronic controller EC is configured to control the actuator 52 to move the movable member RD2 to the target stop position TP in the case where the second condition is met. For example, the electronic controller EC is configured to control the actuator 52 to move the movable member RD2 to the target stop position TP in the case where the output V of the output unit 60 is greater than or equal to the second threshold TH2 in the third communication mode CM3. The electronic controller EC is configured to control the actuator 52 to move the movable member RD2 to the target stop position TP regardless of a control signal transmitted from the operating device 24 in the case where the output V of the output unit 60 is greater than or equal to the second threshold TH2 in the third communication mode CM3.

As seen in FIGS. 5 and 9, the actuating control includes a returning control in which the electronic controller EC controls the actuator 52 to move the movable member RD2 to the target stop position TP in a case where the position PM of the movable member RD2 is offset from the target stop position TP. Thus, the electronic controller EC is configured to execute the actuating control in which the electronic controller EC controls the actuator to move the movable member RD2 to the target stop position TP in a case where a position PM of the movable member RD2 is offset from the target stop position TP. The electronic controller EC is configured to control the actuator to move the movable member RD2 to the target stop position TP in the case where the position PM of the movable member RD2 is offset from the target stop position TP.

The electronic controller EC is configured to store the target stop position TP. The electronic controller EC is configured to store the position sensed by the position sensor 62. The electronic controller EC is configured to compare the target stop position TP and the position sensed by the position sensor 62. The electronic controller EC is configured to control the actuator 52 to stop the movable member RD2 in the target stop position TP.

Figure 10:
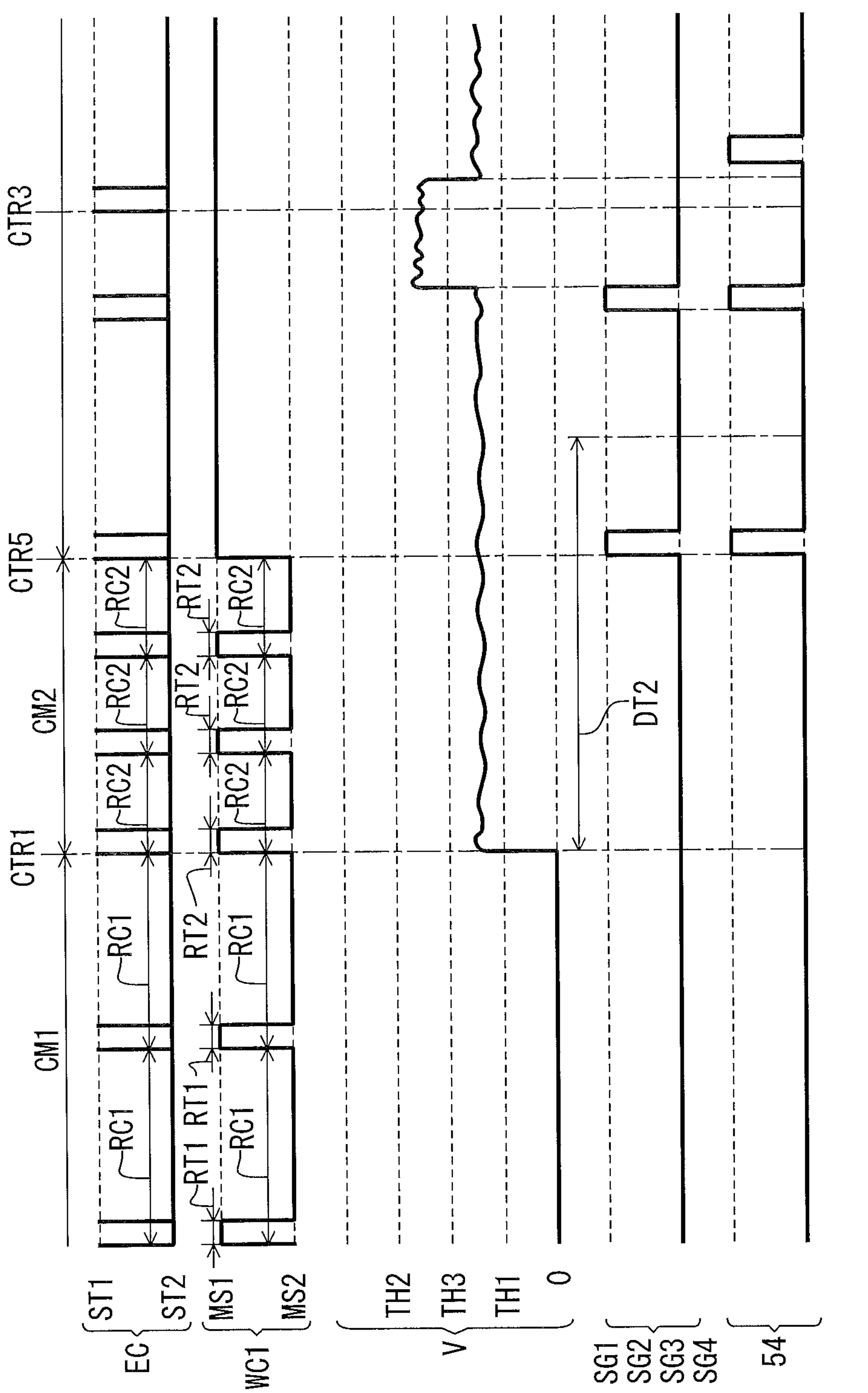
FIG. 10 is a timing chart showing modes and states of an electric device of the derailleur illustrated in FIG. 1.

As seen in FIGS. 5 and 10, the electronic controller EC is configured to execute a third control CTR3 different from the second control CTR2 in a case where a third condition that the output V of the output unit 60 is greater than or equal to a third threshold TH3 is met. The electronic controller EC is configured to execute the third control CTR3 in a case where the third condition is met in the third mode MD3. The electronic controller EC is configured to execute the third control CTR3 different from the first control CTR1 and the second control CTR2 in the case where the third condition that the output V of the output unit 60 is greater than or equal to the third threshold TH3 is met.

In the present embodiment, the third threshold TH3 is different from the second threshold TH2. The third threshold TH3 is less than second threshold TH2. The third threshold TH3 ranges from 2 G to 10 G. For example, the third threshold TH3 is 5 G while the second threshold TH2 is 30 G. However, each of the second threshold TH2 and the third threshold TH3 is not limited to the above values.

The third control CTR3 includes an obtaining control in which the electronic controller EC obtains information for adjusting the target stop position TP of the movable member RD2 based on the output V of the output unit 60. The information includes the target stop position TP and the current position PM of the movable member RD2. The information can include a difference between the target stop position TP and the current position PM of the movable member RD2.

The electronic controller EC is configured to identify a chain vibrating position of the chain 16 mounted on the human-powered vehicle based on the output V of the output unit 60 in the obtaining control. The chain vibration position includes a position PM of the movable member RD2 in which vibration of the chain 16 exceed a certain level. The chain vibrating position can also be referred to as a rasping position. For example, an offset of the movable member RD2 from the target stop position TP may cause rasping of the chain 16.

Figure 11:
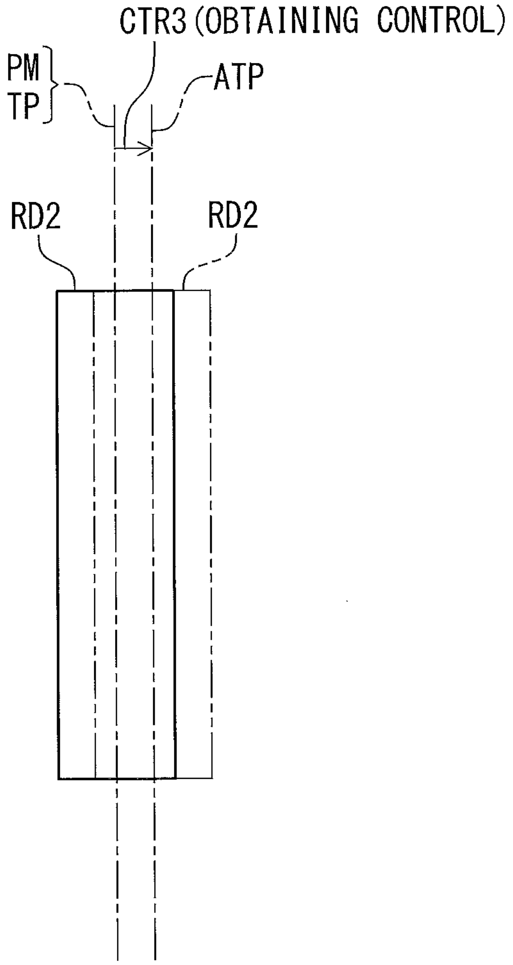
FIG. 11 is a schematic diagram showing a relationship between the target position, an adjusted target position, and the movable member of the derailleur illustrated in FIG. 1.

As seen in FIG. 11, the electronic controller EC is configured to adjust the target stop position TP of the movable member RD2 based on the output V of the output unit 60 in the obtaining control. The electronic controller EC adjusts the target stop position TP of the movable member RD2 based on the output V of the output unit 60 and the chain vibrating position in the obtaining control.

For example, the electronic controller EC is configured to adjust at least one of the plurality of target stop positions TP1 to TP12 based on the output V of the output unit 60 and the chain vibrating position in the obtaining control. The electronic controller EC is configured to store a table including values corresponding to the plurality of target stop positions TP1 to TP12. The electronic controller EC is configured to change at least one of the values of the table to adjust corresponding one of the plurality of target stop positions TP1 to TP12. The electronic controller EC is configured to change at least one of the values of the table to adjust corresponding one of the plurality of target stop positions TP1 to TP12. The electronic controller EC can be configured to selectively change one of the values of the table after the obtaining control. The electronic controller EC can be configured to change at least two of the values of the table all at once after the obtaining control. The electronic controller EC can be configured to change all the values of the table all at once after the obtaining control. The electronic controller EC can be configured to adjust at least one of the plurality of target stop positions TP1 to TP12 in the third mode MD3.

In the present embodiment, the obtaining control include the actuating control. The electronic controller EC is configured to control the actuator 52 to move the movable member RD2 to the adjusted target stop position ATP.

The electronic controller EC can be configured to obtain the information while the electronic controller EC controls the actuator 52 to move the movable member RD2. The electronic controller EC can be configured to adjust the target stop position TP while the electronic controller EC controls the actuator 52 to move the movable member RD2. The electronic controller EC can be configured to control the actuator 52 to move the movable member RD2 to the adjusted target stop position ATP adjusted by the electronic controller EC. The electronic controller EC can be configured to obtain the information without moving the movable member RD2. Namely, the actuating control can be omitted from the obtaining control if needed or desired.

Figure 12:
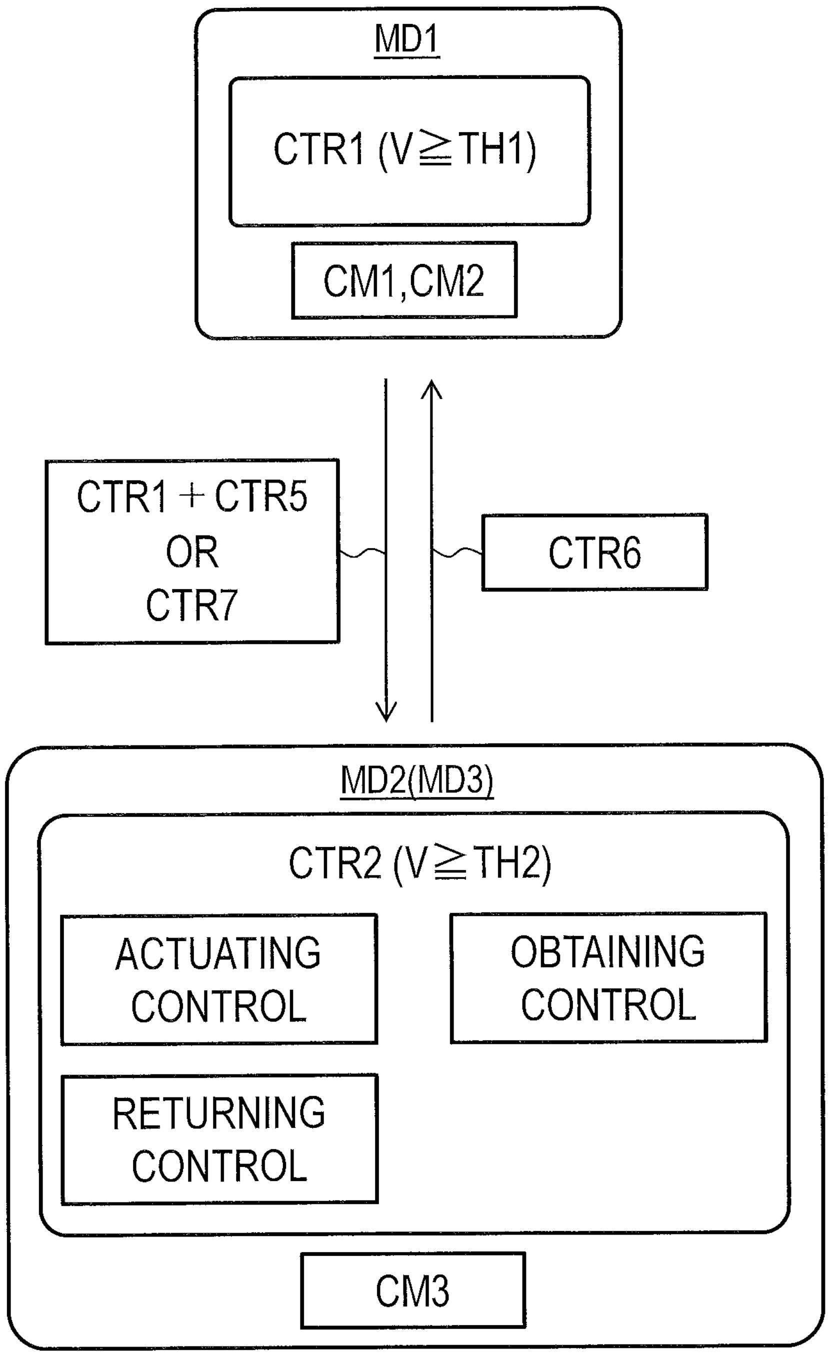
FIG. 12 is a schematic block diagram showing modes and states of an electric device of the derailleur in accordance with a modification.

As seen in FIG. 12. the second control CTR2 can include the obtaining control in which the electronic controller EC obtains information for adjusting the target stop position TP of the movable member RD2 based on the output V of the output unit 60. In such modifications, the obtaining control can be omitted from the third control CTR3. The third control CTR3 and the third threshold TH3 can be omitted from the electric device 50. The electronic controller EC can be configured to identify the chain vibrating position of the chain 16 mounted on the human-powered vehicle 2 based on the output V of the output unit 60 in the obtaining control of the second control CTR2. The electronic controller EC can be configured to adjust the target stop position TP of the movable member RD2 based on the output V of the output unit 60 in the obtaining control of the second control CTR2. The electronic controller EC adjusts the target stop position TP of the movable member RD2 based on the output V of the output unit 60 and the chain vibrating position in the obtaining control. The second mode MD2 can include the actuating control, the returning control, and the obtaining control. The third mode MD3 can be omitted in a case where the second mode MD2 can include the actuating control, the returning control, and the obtaining control.

The electronic controller EC can be configured to obtain the information while the electronic controller EC controls the actuator 52 to move the movable member RD2. The electronic controller EC can be configured to adjust the target stop position TP while the electronic controller EC controls the actuator 52 to move the movable member RD2. The electronic controller EC can be configured to control the actuator 52 to move the movable member RD2 to the adjusted target stop position ATP adjusted by the electronic controller EC. The electronic controller EC can be configured to obtain the information without moving the movable member RD2. Namely, the actuating control can be omitted from the obtaining control if needed or desired.

Figure 13:
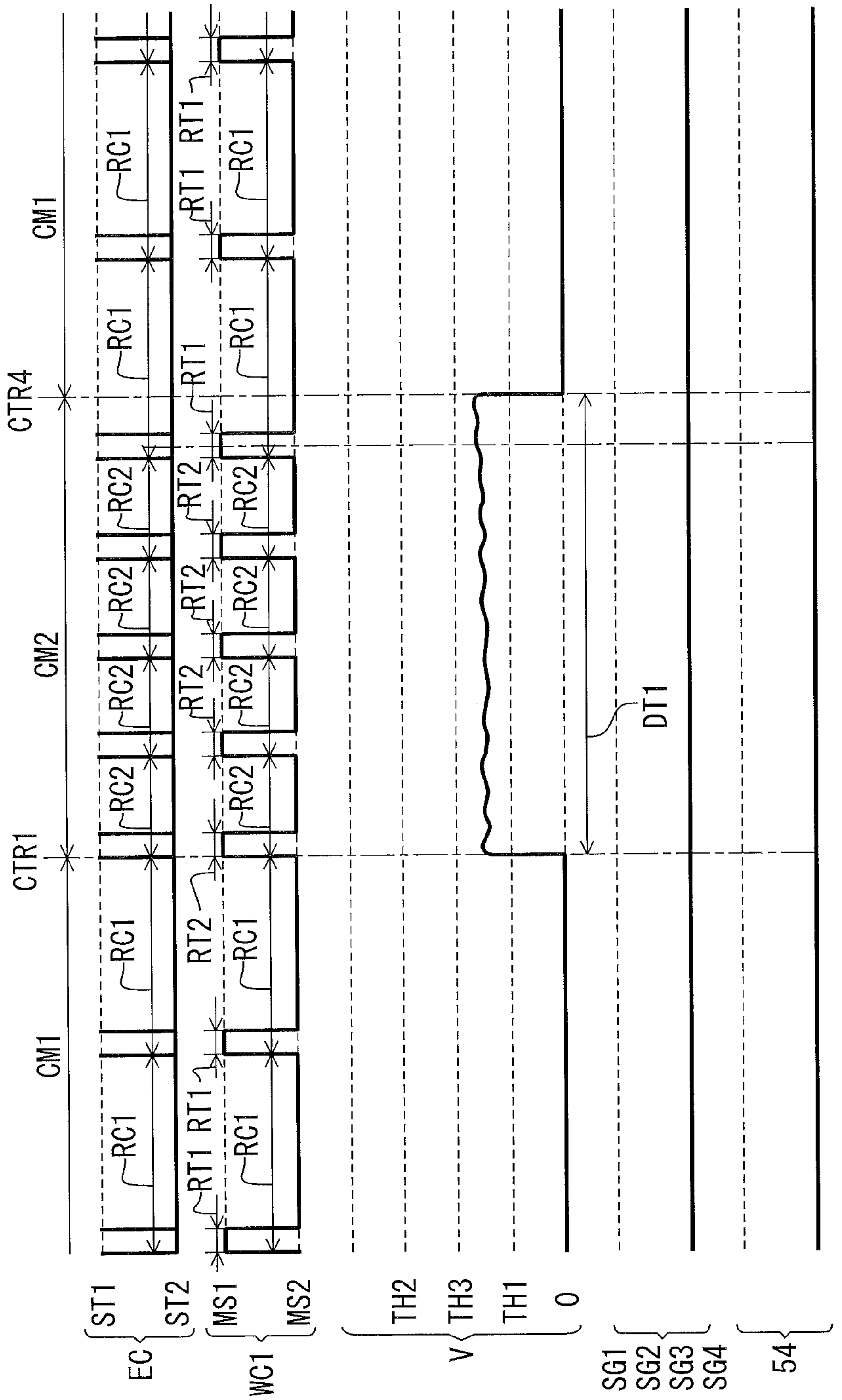
FIG. 13 is a timing chart showing modes and states of an electric device of the derailleur illustrated in FIG. 1.

As seen in FIGS. 5 and 13, the electronic controller EC is configured to execute a fourth control CTR4 to change the communication mode from the second communication mode CM2 to the first communication mode CM1 in a case where a fourth condition that the communicator WC1 does not receive a first signal SG1 for a first determination time DT1 is met. The electronic controller EC is configured to change the communication mode from the second communication mode CM2 to the first communication mode CM1 in a case where the communicator WC1 does not receive the first signal SG1 for the first determination time DT1 in the second communication mode CM2.

For example, the electronic controller EC is configured to change the communication mode from the second communication mode CM2 to the first communication mode CM1 in a case where the communicator WC1 does not receive the control signal CS for the first determination time DT1 in the second communication mode CM2. The electronic controller EC is configured to change the communication mode from the second communication mode CM2 to the first communication mode CM1 in a case where the communicator WC1 does not receive the output V of the output unit 60 for the first determination time DT1 in the second communication mode CM2.

For example, the first signal SG1 includes at least one of the control signal CS and the output V of the output unit 60. The operating device 24 is configured to transmit the first signal SG1 in response to a first user input. The operating device 24 is configured to transmit the control signal CS in response to the first user input. However, the first signal SG1 can indicate other actions if needed or desired. At least one of the control signal CS and the output V of the output unit 60 can be omitted from the first signal SG1 if needed or desired.

Figure 14:
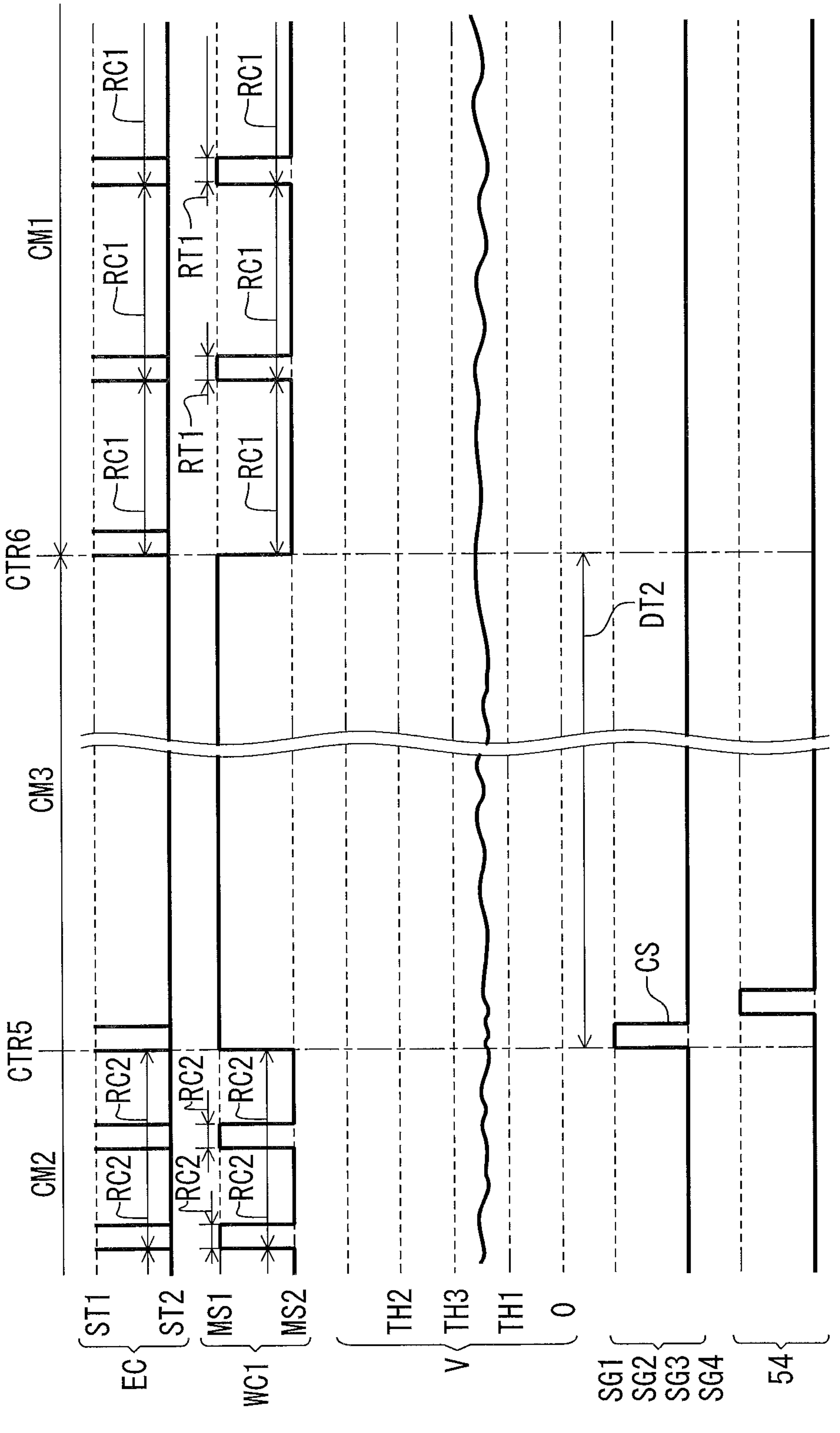
FIG. 14 is a timing chart showing modes and states of an electric device of the derailleur illustrated in FIG. 1.

As seen in FIGS. 5 and 14, the electronic controller EC is configured to execute a fifth control CTR5 to change the communication mode from the second communication mode CM2 to the third communication mode CM3 in a case where a fifth condition is met in the second communication mode CM2. The electronic controller EC is configured to change the mode from the first mode MD1 to the second mode MD2 in a case where the fifth condition is met in the second communication mode CM2 after the first condition is med in the first communication mode CM1.

The fifth condition includes a condition relating to receipt of a second signal SG2 transmitted from the additional communicator. The electronic controller EC is configured to execute the fifth control CTR5 in a case where the communicator WC1 recognizes the second signal SG2 transmitted from the additional communicator in the second communication mode CM2. The electronic controller EC is configured to change the communication mode from the second communication mode CM2 to the third communication mode CM3 in a case where the communicator WC1 receives the second signal SG2 in the second communication mode CM2.

For example, the second signal SG2 includes the control signal CS transmitted from the operating device 24. The second signal SG2 is free of the output V of the output unit 60. Thus, the electronic controller EC is configured to execute the fifth control CTR5 different from the first control CTR1 in a case where the fifth condition which is free of the output V of the output unit 60 is met in the second communication mode CM2. As with the first signal SG1, the second signal SG2 includes the control signal CS. However, the second signal SG2 can include another signal other than control signal CS if needed or desired.

As seen in FIGS. 5 and 14, the electronic controller EC is configured to execute a sixth control CTR6 to change the communication mode from the third communication mode CM3 to the first communication mode CM1 in a case where a sixth condition that the communicator WC1 does not receive a third signal SG3 for a second determination time DT2 is met. The electronic controller EC is configured to change the communication mode from the third communication mode CM3 to the first communication mode CM1 in a case where the communicator WC1 does not receive the third signal SG3 for the second determination time DT2 in the third communication mode CM3. The electronic controller EC is configured to maintain the third communication mode CM3 in a case where the communicator WC1 receives the third signal SG3 in the third communication mode CM3. The electronic controller EC is configured to change the mode from the second mode MD2 to the first mode MD1 in a case where the sixth condition is met in the second mode MD2.

For example, the third signal SG3 includes the control signal CS transmitted from the operating device 24. The third signal SG3 is free of the output V of the output unit 60. Thus, the electronic controller EC is configured to execute the sixth control CTR6 in a case where the sixth condition which is free of the output V of the output unit 60 is met in the third communication mode CM3. The electronic controller EC is configured to execute the sixth control CTR6 in a case where the output V of the output unit 60 is greater than zero in the third communication mode CM3. As with the first signal SG1, the third signal SG3 includes the control signal CS. However, the third signal SG3 can include another signal other than control signal CS if needed or desired. The third signal SG3 can include the output V of the output unit 60 if needed or desired. The sixth condition can include the output V of the output unit 60 instead of or in addition to the control signal CS if needed or desired. In such modifications, for example, the electronic controller EC can be configured to execute the sixth control CTR6 in a case where the communicator WC1 does not receive the output V of the output unit 60 for the second determination time DT2 after the output V of the output unit 60 is stopped.

Figure 15:
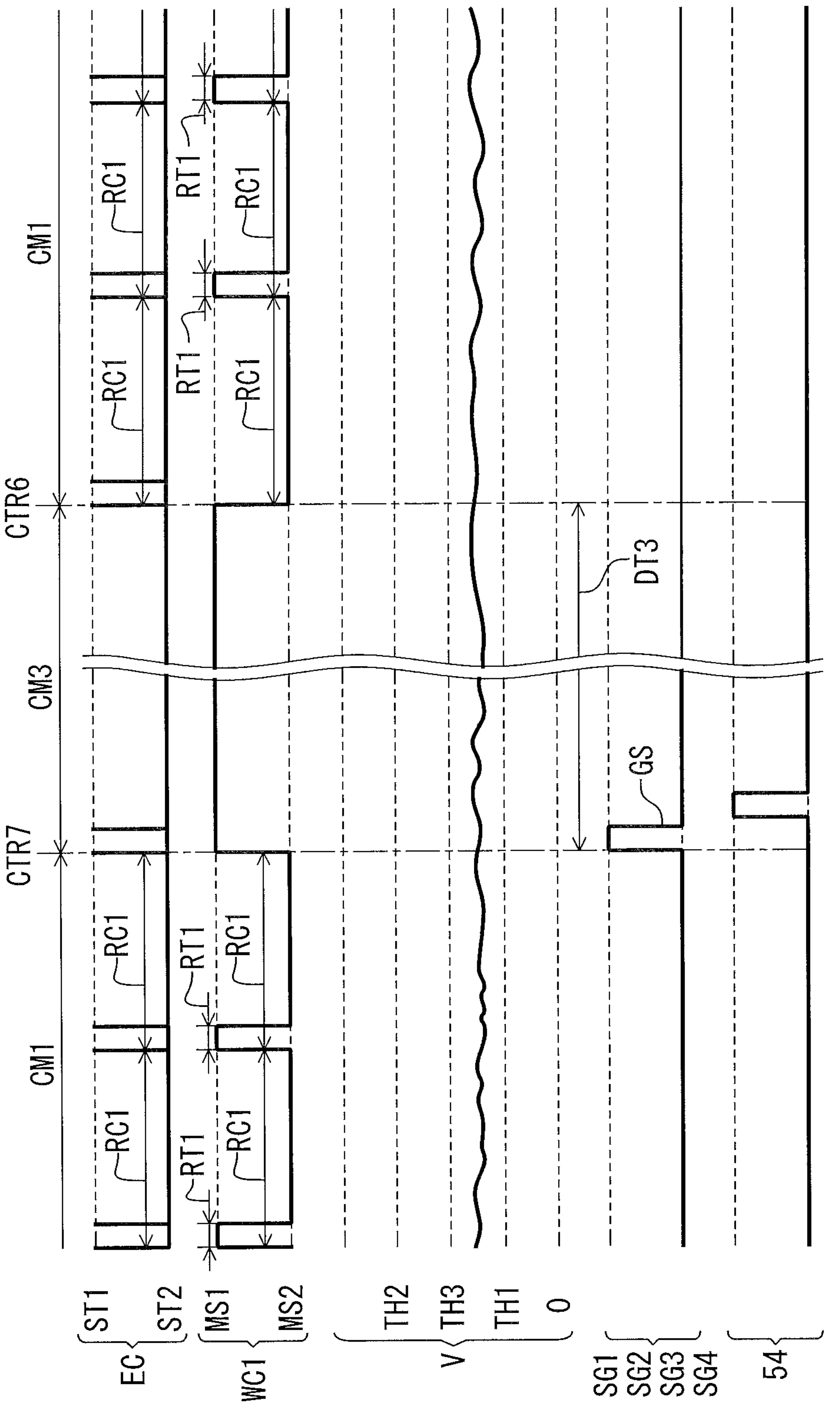
FIG. 15 is a timing chart showing modes and states of an electric device of the derailleur illustrated in FIG. 1.

As seen in FIGS. 5 and 15, the electronic controller EC is configured to execute a seventh control CTR7 to change the communication mode from the first communication mode CM1 to the third communication mode CM3 in a case where a seventh condition that the communicator WC1 receives a fourth signal SG4 for a third determination time DT3 is met. The electronic controller EC is configured to change the communication mode from the first communication mode CM1 to the third communication mode CM3 in a case where the communicator WC1 receives the fourth signal SG4 in the first communication mode CM1. The electronic controller EC is configured to change the mode from the first mode MD1 to the second mode MD2 in a case where the seventh condition is met in the first communication mode CM1.

For example, the fourth signal SG4 includes the control signal CS transmitted from the operating device 24. The fourth signal SG4 is free of the output V of the output unit 60. Thus, the electronic controller EC is configured to execute the seventh control CTR7 in a case where the seventh condition which is free of the output V of the output unit 60 is met in the first communication mode CM1. As with the first signal SG1, the fourth signal SG4 includes the control signal CS. However, the fourth signal SG4 can include another signal other than control signal CS if needed or desired.

As seen in FIG. 5, the electronic controller EC is configured to change the mode between the second mode MD2 and the third mode MD3 in response to at least one user operation. The electronic controller EC is configured to change the mode between the first mode MD1 and the third mode MD3 in response to the at least one user operation. Examples of the at least one user operation include a user operation of an electric switch, a communication with an additional electric device, and a physical change of the human-powered vehicle 2. For example, the at least one user operation can include the first signal SG1, the second signal SG2, the third signal SG3, the fourth signal SG4, or another signal.

Modifications

Figure 16:
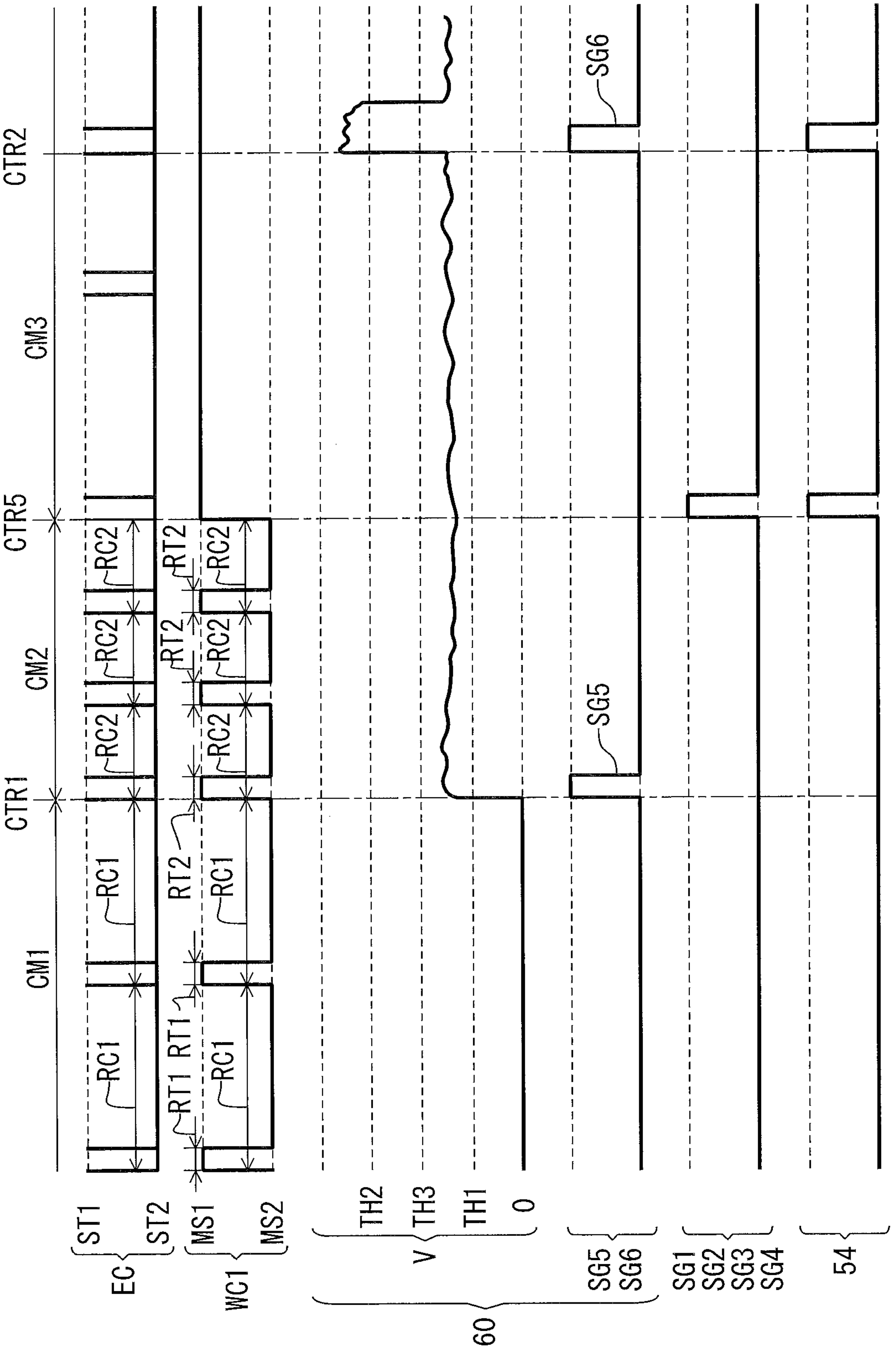
FIG. 16 is a timing chart showing modes and states of an electric device of the derailleur in accordance with a modification.

In each of the above embodiments and the modifications thereof, the electronic controller EC compares the output V of the output unit 60 with a threshold and determines the first to fourth conditions. However, the output unit 60 can be configured to compare the output V of the output unit 60 with a threshold and to determine the first to fourth conditions if needed or desired. In such modifications, as seen in FIG. 16, the output unit 60 is configured to determine whether the first condition is met. The output unit 60 is configured to determine whether the second condition is met. The output unit 60 is configured to transmit a first output signal SG5 to the electronic controller EC in the case where the first condition is met. The electronic controller EC is configured to execute the first control CTR1 in response to the first output signal SG5. The output unit 60 is configured to transmit a second output signal SG6 to the electronic controller EC in the case where the second condition is met. The electronic controller EC is configured to execute the second control CTR2 in response to the second output signal SG6. The first output signal SG5 includes information indicative of the first control CTR1. The second output signal SG6 includes information indicative of the second control CTR2. The output unit 60 can be configured to output signals at regular intervals and to output the first output signal SG5 only in the case where the first condition is met. The output unit 60 can be configured to output signals at regular intervals and to output the second output signal SG6 only in the case where the second condition is met.

Figure 17:
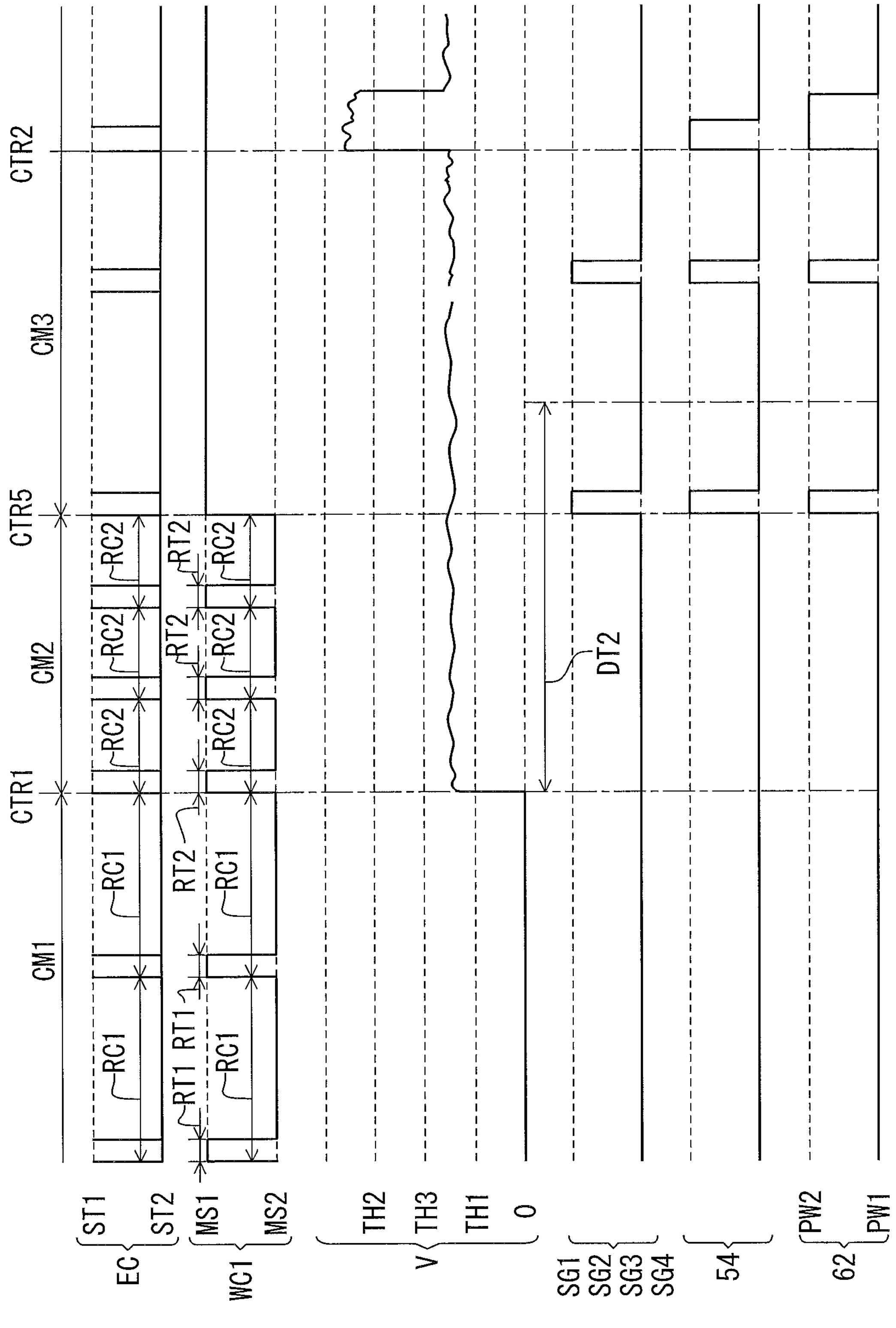
FIG. 17 is a timing chart showing modes and states of an electric device of the derailleur in accordance with a modification.

In each of the above embodiments and the modifications thereof, the position sensor 62 is configured to sense the position of the movable member RD2. As seen in FIG. 17, however, a power state of the position sensor 62 can be changed if needed or desired. In the modification depicted in FIG. 17, the electronic controller EC is configured to change the power state of the position sensor 62 from a first power state PW1 to a second power state PW2 in a case where acceleration sensed by the sensor 60 is greater than or equal to the second threshold TH2. The electronic controller EC is configured to change the power state of the position sensor 62 from the second power state PW2 to the first power state PW1 in the case where acceleration sensed by the sensor 60 is smaller than second threshold TH2. The electronic controller EC is configured to change the power state of the position sensor 62 from the first power state PW1 to the second power state PW2 in response to the control signal CS. The electronic controller EC is configured to maintain the second power state of the position sensor 62 during a specific time. The electronic controller EC can be configured to change the power state of the position sensor 62 from the second power state PW2 to the first power state PW1 in a case where the communicator WC1 does not receive the control signal CS for a determination time.

The first power state PW1 includes a state where the position sensor 62 is turned off or is in a sleep state. The second power state PW2 includes a state where the position sensor 62 is turned on. Power consumption of the first power state PW1 is lower than power consumption of the second power state PW2. For example, the electronic controller EC is configured to turn the position sensor 62 on in the case where the acceleration sensed by the sensor 60 is greater than or equal to the second threshold TH2. The electronic controller EC is configured to turn the position sensor 62 off in the case where the acceleration sensed by the sensor 60 is smaller than second threshold TH2.

Figure 18:
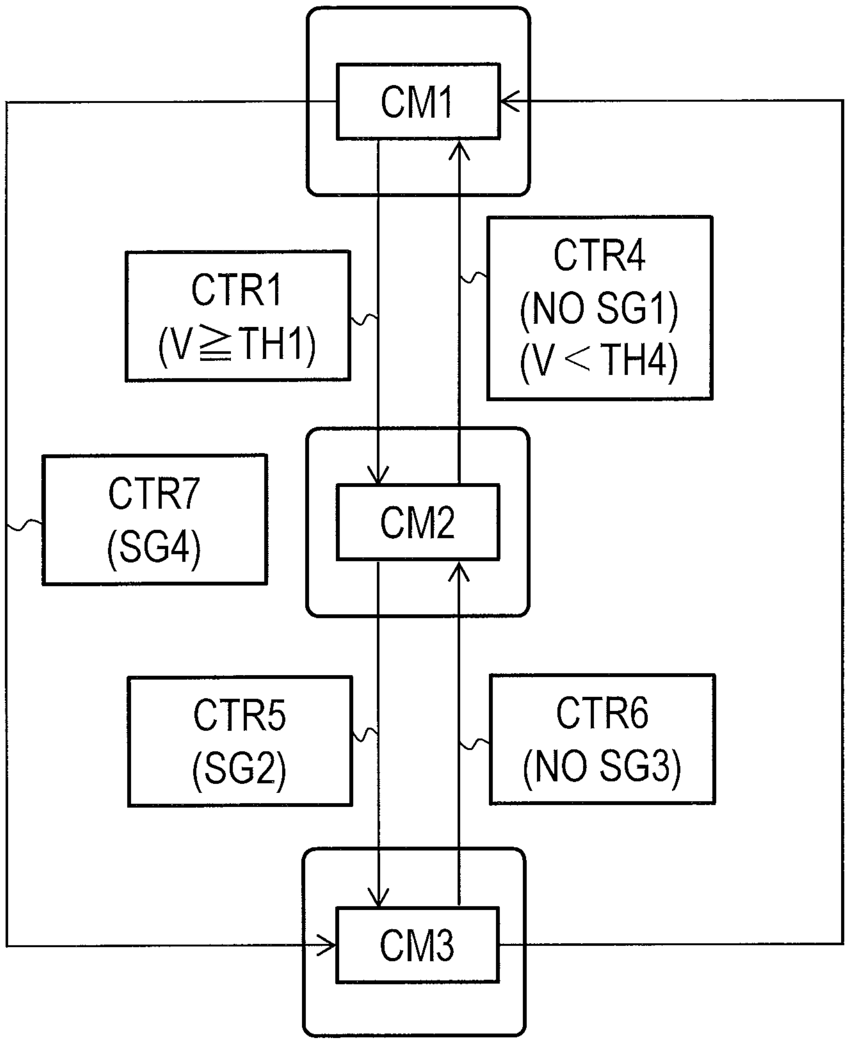
FIG. 18 is a schematic block diagram showing modes and states of an electric device of the derailleur in accordance with a modification.

In each of the above embodiments and the modifications thereof, the electronic controller EC is configured to execute a sixth control CTR6 to change the communication mode from the third communication mode CM3 to the first communication mode CM1 in a case where a sixth condition that the communicator WC1 does not receive a third signal SG3 for a second determination time DT2 is met. As seen in FIG. 18, however, the electronic controller EC can be configured to execute the sixth control CTR6 to change the communication mode from the third communication mode CM3 to the second communication mode CM2 in the case where the sixth condition is met if needed or desired.

In each of the above embodiments and the modifications thereof, the electronic controller EC is configured to execute the obtaining control in the case where the third condition is met. However, the electronic controller EC can be configured to execute the obtaining control in a case where another condition is met if needed or desired. For example, the electronic controller EC can be configured to execute the obtaining control in response to at least one of the control signal CS transmitted from the operating device 24, an operation of a switch provided to another component, an output of the sensor 38, an output of the sensor 40, and an output of the sensor 42.

In each of the above embodiments and the modifications thereof, the first mode includes the first communication mode CM1, and the second mode includes the second communication mode CM2. However, the first mode can include one of the first communication mode CM1, the second communication mode CM2, and the third communication mode CM3. The second mode can include another of the first communication mode CM1, the second communication mode CM2, and the third communication mode CM3. The first mode can include a fourth communication mode in which the communicator WC1 is completely turned off not to recognize a wireless signal. The second mode can include the fourth communication mode.

Figure 19:
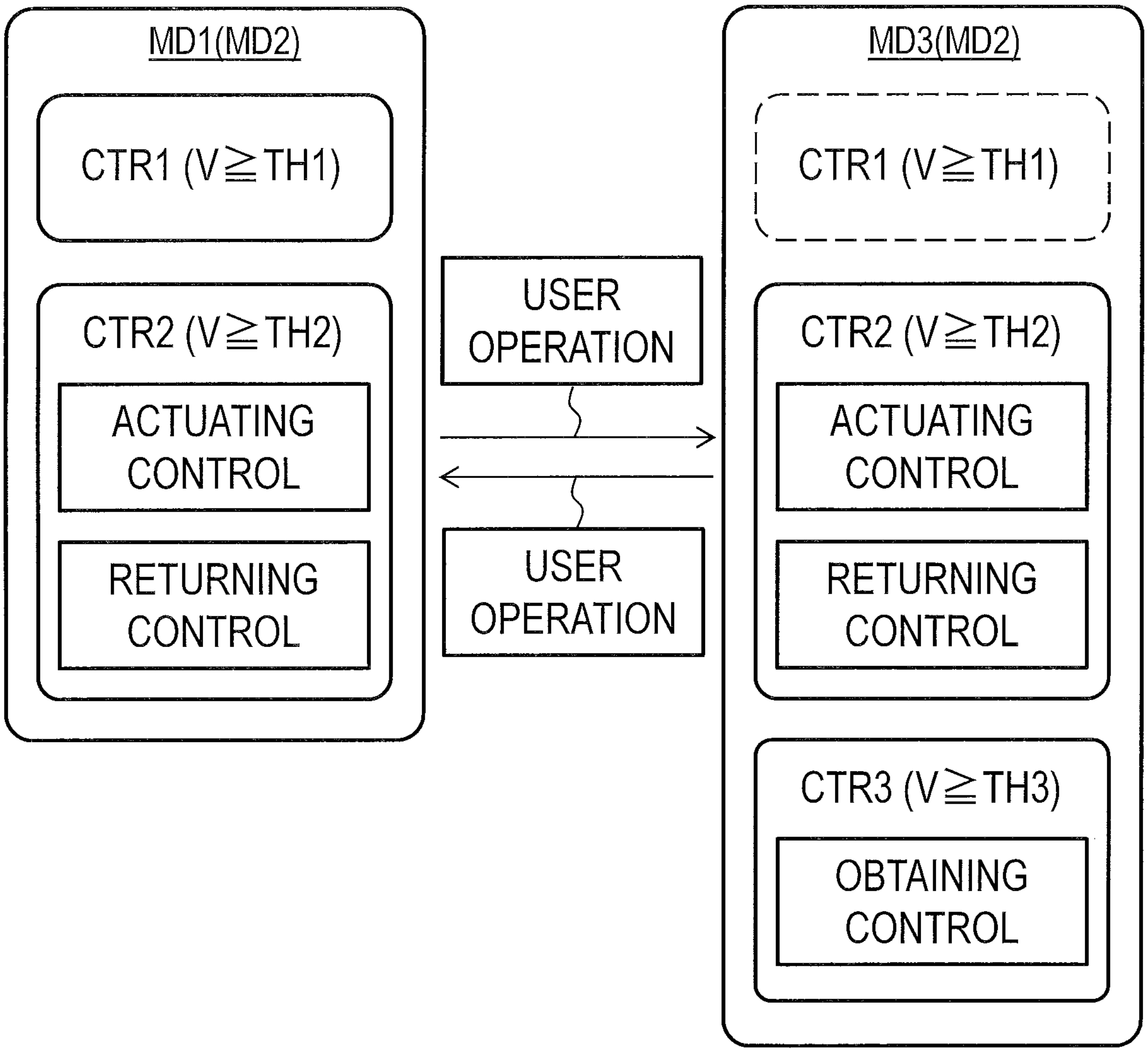
FIG. 19 is a schematic block diagram showing modes and states of an electric device of the derailleur in accordance with a modification.

As seen in FIG. 19, the first mode MD1 can at least partially include the second mode MD2, and the third mode MD3 can at least partially include the second mode MD2. In such modifications, the first mode MD1 corresponds to a mode in which the human-powered vehicle 2 is in use. The electronic controller EC is configured to change the mode between the first mode MD1 and the third mode MD3 in response to the at least one user operation. The electronic controller EC can be configured to use the first threshold TH1 and the second threshold TH2 in the first mode MD1. The electronic controller EC can be configured to use the second threshold TH2 and the third threshold TH3 in the third mode MD3. As indicated with a dotted line in FIG. 19, the electronic controller EC can be configured to use the first threshold TH1 in the third mode MD3.

In each of the above embodiments and the modifications thereof, the electronic controller EC has the first mode MD1, the second mode MD2, and the third mode MD3. However, the first mode MD1, the second mode MD2, and the third mode MD3 can be omitted from the electronic controller EC if needed or desired. In such modifications, the electronic controller EC is configured to use the first threshold TH1, the second threshold TH2, and the third threshold TH3 regardless of a state of the electric device 50.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both Band C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An electric device of a human-powered vehicle, comprising:

a communicator configured to communicate with an additional communicator in accordance with a communication mode;

an electronic controller configured to execute a first control to change the communication mode in a case where a first condition that an output of an output unit is greater than or equal to a first threshold is met; and the electronic controller being configured to execute a second control different from the first control in a case where a second condition that the output of the output unit is greater than or equal to a second threshold is met, the second threshold being different from the first threshold.

2. The electric device according to claim 1, wherein the communicator is configured to receive a signal from the additional communicator.

3. The electric device according to claim 1, wherein the second threshold is greater than the first threshold.

4. The electric device according to claim 1, wherein the second control includes an actuating control in which the electronic controller controls an actuator to move a movable member.

5. The electric device according to claim 4, wherein the actuating control includes a returning control in which the electronic controller controls the actuator to move the movable member to a target stop position in a case where a position of the movable member is offset from the target stop position.

6. The electric device according to claim 1, wherein the second control includes an obtaining control in which the electronic controller obtains information for adjusting a target stop position of a movable member based on the output of the output unit.

7. The electric device according to claim 6, wherein the electronic controller is configured to identify a chain vibrating position of a chain mounted on the human-powered vehicle based on the output of the output unit in the obtaining control.

8. The electric device according to claim 6, wherein the electronic controller is configured to adjust a target stop position of the movable member based on the output of the output unit in the obtaining control.

9. The electric device according to claim 1, wherein the electronic controller is configured to execute a third control different from the first control and the second control in a case where a third condition that the output of the output unit is greater than or equal to a third threshold is met.

10. The electric device according to claim 9, wherein the second control includes an actuating control in which the electronic controller controls an actuator to move a movable member.

11. The electric device according to claim 1, wherein the electronic controller is configured to control the electric device in accordance with an operating mode, the operating mode includes a first mode and a second mode, the electronic controller is configured to execute the first control in a case where the first condition is met in the first mode, and the electronic controller is configured to execute the second control in a case where the second condition is met in the second mode.

12. The electric device according to claim 11, wherein the electronic controller is configured to operate with first power consumption in the first mode, the electronic controller is configured to operate with second power consumption in the second mode, and the first power consumption is lower than the second power consumption.

13. The electric device according to claim 1, wherein the electronic controller is configured to execute the first control to change the communication mode from a first communication mode to a second communication mode in the case where the first condition is met.

14. The electric device according to claim 13, wherein the electronic controller is configured to execute a fourth control to change the communication mode from the second communication mode to the first communication mode in a case where a fourth condition that the communicator does not receive a first signal for a first determination time is met.

15. The electric device according to claim 13, wherein the electronic controller is configured to execute a fifth control different from the first control in a case where a fifth condition which is free of the output of the output unit is met in the second communication mode.

16. The electric device according to claim 15, wherein the fifth condition includes a condition relating to receipt of a second signal transmitted from the additional communicator, and the electronic controller is configured to execute the fifth control in a case where the communicator recognizes the second signal transmitted from the additional communicator in the second communication mode.

17. The electric device according to claim 15, wherein the electronic controller is configured to execute the fifth control to change the communication mode from the second communication mode to a third communication mode in a case where the fifth condition is met in the second communication mode.

18. The electric device according to claim 17, wherein the electronic controller is configured to execute a sixth control to change the communication mode from the third communication mode to the first communication mode in a case where a sixth condition that the communicator does not receive a third signal for a second determination time is met.

19. The electric device according to claim 13, wherein the electronic controller is configured to set a reception cycle of the communicator to a first reception cycle in the first communication mode.

20. The electric device according to claim 19, wherein the electronic controller is configured to set a reception cycle of the communicator to a second reception cycle in the second communication mode.

21. The electric device according to claim 20, wherein the second reception cycle is shorter than the first reception cycle.

22. The electric device according to claim 1, wherein the output unit includes at least one of a vibration sensor, an acceleration sensor and a motion sensor.

23. The electric device according to claim 1, wherein the output unit is configured to transmit a first output signal to the electronic controller in the case where the first condition is met, and the output unit is configured to transmit a second output signal to the electronic controller in the case where the second condition is met.

24. The electric device according to claim 23, wherein the electronic controller is configured to execute the first control in response to the first output signal, and the electronic controller is configured to execute the second control in response to the second output signal.

25. The electric device according to claim 1, further comprising:
a rotational shaft; and
a position sensor, wherein
the electronic controller is configured to obtain a rotational position of the rotational shaft based on an output of the position sensor.

26. The electric device according to claim 1, wherein the communicator includes a wireless communicator configured to wirelessly communicate with the additional communicator.

27. A derailleur comprising:
a base member mountable to a human-powered vehicle;
a movable member movably coupled to the base member; and
the electric device according to claim 1.

* * * * *